(12) United States Patent
Grant Bradnick et al.

(10) Patent No.: US 10,311,518 B2
(45) Date of Patent: Jun. 4, 2019

(54) ORDER FEED MESSAGE STREAM INTEGRITY

(71) Applicant: TRADING TECHNOLOGIES INTERNATIONAL INC., Chicago, IL (US)

(72) Inventors: Erica Joan Grant Bradnick, Chicago, IL (US); Leslie Michael Brody, Skokie, IL (US); Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

(21) Appl. No.: 16/170,354

(22) Filed: Oct. 25, 2018

(65) Prior Publication Data
US 2019/0066210 A1    Feb. 28, 2019

Related U.S. Application Data

(63) Continuation of application No. 14/840,787, filed on Aug. 31, 2015, now Pat. No. 10,152,751, which is a
(Continued)

(51) Int. Cl.
*G06F 15/16* (2006.01)
*G06Q 40/04* (2012.01)
(Continued)

(52) U.S. Cl.
CPC ............ *G06Q 40/04* (2013.01); *G06Q 40/06* (2013.01); *H04L 1/1642* (2013.01); *H04L 43/08* (2013.01); *H04L 43/0847* (2013.01); *H04L 43/10* (2013.01)

(58) Field of Classification Search
CPC ...... G06Q 40/04; G06Q 40/06; H04L 1/1642; H04L 43/08; H04L 43/0847; H04L 43/10
(Continued)

(56) References Cited

U.S. PATENT DOCUMENTS 6,144,669 A    11/2000  Williams et al.
6,389,016 B1    5/2002  Sabaa et al.
(Continued)

FOREIGN PATENT DOCUMENTS

CN    1753391 B    3/2006
CN    1997984 A    7/2007
(Continued)

OTHER PUBLICATIONS

Amir, Y., "Distributed Systems 600.437 Multicast Protocols," The Johns Hopkins University, Baltimore, Maryland, USA, 2010, 16 pages.
(Continued)

*Primary Examiner* — Melvin H Pollack
(74) *Attorney, Agent, or Firm* — McDonnell Boehnen Hulbert & Berghoff LLP

(57) ABSTRACT

Systems, methods, and computer-readable storage media are provided for improving order feed message stream integrity. Certain embodiments provide a method including sending, by a computing device, a first data message; sending a first stop message; clearing a message stream state; and sending a second data message. The first data message includes data related to an order for a tradeable object, a first sequence number with a value of a predefined initial sequence number, and a first phase number. The second data message includes data related to an order, a second sequence number with a value of the predefined initial sequence number, and a second phase number, wherein the second phase number is different than the first phase number. The message stream state is associated with the order.

21 Claims, 14 Drawing Sheets

Related U.S. Application Data continuation of application No. 14/260,768, filed on Apr. 24, 2014, now Pat. No. 9,154,393, which is a continuation of application No. 13/225,047, filed on Sep. 2, 2011, now Pat. No. 8,745,157.

(51) Int. Cl.
*G06Q 40/06* (2012.01)
*H04L 12/26* (2006.01)
*H04L 1/16* (2006.01)

(58) Field of Classification Search
USPC .......................................................... 709/217
See application file for complete search history.

(56) References Cited

U.S. PATENT DOCUMENTS

| | | | |
|---|---|---|---|
| 6,574,234 B1 | 6/2003 | Myer et al. | |
| 6,744,765 B1 | 6/2004 | Dearth et al. | |
| 7,069,551 B2 | 6/2006 | Fong et al. | |
| 7,107,240 B1 | 9/2006 | Silverman et al. | |
| 7,752,123 B2 | 7/2010 | Brookfield et al. | |
| 7,809,841 B1 | 10/2010 | Crouch | |
| 7,890,415 B1 | 2/2011 | Keith | |
| 7,916,741 B2* | 3/2011 | Elmeleegy | H04L 47/10 370/252 |
| 7,983,622 B1* | 7/2011 | Vaughan | H04B 17/382 455/304 |
| 7,991,847 B2 | 8/2011 | Cadoret et al. | |
| 8,010,679 B2 | 8/2011 | Low et al. | |
| 8,041,985 B2* | 10/2011 | Callaway | G06F 11/1641 714/4.1 |
| 8,069,402 B2 | 11/2011 | Myers et al. | |
| 8,082,304 B2 | 12/2011 | Ho et al. | |
| 8,090,645 B1 | 1/2012 | Silverman et al. | |
| 8,090,839 B2 | 1/2012 | Kumar et al. | |
| 8,095,601 B2* | 1/2012 | Hasha | H04L 12/42 709/206 |
| 8,176,186 B2* | 5/2012 | McCanne | H03M 7/30 709/228 |
| 8,200,563 B2* | 6/2012 | Moran | G06Q 10/10 705/36 R |
| 8,230,056 B2 | 7/2012 | Bishop et al. | |
| 8,249,975 B1 | 8/2012 | Keith | |
| 8,275,905 B2* | 9/2012 | Xiao | G06F 9/546 709/201 |
| 8,417,618 B2 | 4/2013 | Milne et al. | |
| 8,468,082 B2 | 6/2013 | Doornebos et al. | |
| 8,468,199 B2 | 6/2013 | Tomkow | |
| 8,473,396 B2* | 6/2013 | Hausman | G06Q 10/10 705/35 |
| 8,489,496 B2 | 7/2013 | Angle et al. | |
| 8,676,937 B2* | 3/2014 | Rapaport | H04L 51/32 709/219 |
| 8,700,738 B2* | 4/2014 | Moore | G06F 17/3089 709/203 |
| 8,732,324 B2 | 5/2014 | Weis | |
| 8,745,157 B2 | 6/2014 | Bradnick et al. | |
| 8,782,274 B2 | 7/2014 | Katis et al. | |
| 8,799,135 B2 | 8/2014 | Duquette | |
| 8,812,708 B2* | 8/2014 | Tsai | H04L 41/12 709/230 |
| 8,862,507 B2* | 10/2014 | Sandhu | G06Q 30/0601 705/26.41 |
| 8,949,395 B2* | 2/2015 | Atluri | G06F 11/1453 709/202 |
| 8,959,163 B1* | 2/2015 | Ledet | G06F 17/30699 709/206 |
| 9,154,393 B2 | 10/2015 | Bradnick et al. | |
| 9,373,102 B2* | 6/2016 | Merchant | H04L 51/066 |
| 9,471,925 B2* | 10/2016 | Ramer | G06F 17/30867 |
| 9,479,341 B2 | 10/2016 | Bugenhagen et al. | |
| 9,621,361 B2 | 4/2017 | Bugenhagen et al. | |
| 9,648,147 B2 | 5/2017 | Chen et al. | |
| 9,667,751 B2* | 5/2017 | Fallon | H04L 12/1895 |
| 9,824,342 B2 | 11/2017 | Kelly et al. | |
| 2001/0009547 A1 | 7/2001 | Jinzaki et al. | |
| 2002/0152446 A1 | 10/2002 | Fleming | |
| 2003/0229575 A1 | 12/2003 | Alexander et al. | |
| 2004/0236829 A1 | 11/2004 | Xu et al. | |
| 2005/0243722 A1 | 11/2005 | Liu et al. | |
| 2008/0082142 A1 | 4/2008 | Clark et al. | |
| 2008/0248876 A1 | 10/2008 | Adiraju et al. | |
| 2009/0003360 A1 | 1/2009 | Zhao et al. | |
| 2009/0135723 A1 | 5/2009 | Davidson et al. | |
| 2009/0213850 A1* | 8/2009 | Viger | H04L 47/10 370/389 |
| 2009/0240766 A1 | 9/2009 | Kikkawa et al. | |
| 2009/0322518 A1 | 12/2009 | Liang et al. | |
| 2010/0100475 A1 | 4/2010 | Callaway et al. | |
| 2010/0325229 A1* | 12/2010 | Kelley | H04L 51/063 709/206 |
| 2011/0016123 A1 | 1/2011 | Pandey et al. | |
| 2011/0040668 A1 | 2/2011 | Lee et al. | |
| 2011/0196778 A1 | 8/2011 | Vinokour et al. | |
| 2011/0225448 A1 | 9/2011 | Morosan et al. | |
| 2012/0011046 A1 | 1/2012 | Nalbandian et al. | |
| 2012/0131139 A1* | 5/2012 | Siripurapu | G06F 17/30864 709/217 |
| 2012/0221458 A1* | 8/2012 | Booth | G06Q 40/04 705/37 |
| 2012/0221462 A1 | 8/2012 | DeVerdier | |
| 2012/0290685 A1 | 11/2012 | Garza et al. | |
| 2012/0311089 A1* | 12/2012 | Reed | G06F 9/542 709/217 |
| 2013/0060887 A1 | 3/2013 | Bradnick et al. | |
| 2014/0344363 A1 | 11/2014 | Bradnick et al. | |
| 2015/0371331 A1 | 12/2015 | Bradnick et al. | |
| 2016/0182330 A1 | 6/2016 | Iannaccone et al. | |
| 2016/0277261 A9 | 9/2016 | Ansari et al. | |
| 2017/0104709 A1 | 4/2017 | Vosshall et al. | |
| 2017/0235848 A1* | 8/2017 | Van Dusen | H04L 41/04 705/12 |
| 2017/0293976 A1 | 10/2017 | Duquette | |
| 2018/0007655 A1 | 1/2018 | Raghupathy et al. | |

FOREIGN PATENT DOCUMENTS

| | | |
|---|---|---|
| JP | H1049461 A | 2/1998 |
| JP | 2001-202305 A | 7/2001 |
| JP | 2002-500404 A | 1/2002 |
| JP | 2002-135350 A | 5/2002 |
| JP | 2003-067264 A | 3/2003 |
| JP | 2004-258875 A | 9/2004 |
| JP | 2004-343762 A | 12/2004 |
| JP | 2004-364168 A | 12/2004 |
| JP | 2008-198041 A | 8/2008 |
| JP | 2009-205692 A | 9/2009 |
| JP | 2009-231975 A | 10/2009 |
| KR | 1020010080453 A | 7/2007 |
| KR | 1020090057286 A | 6/2009 |
| KR | 1020060093002 A | 7/2012 |
| TW | 2011008831 A | 3/2011 |
| WO | 2006000991 A1 | 1/2006 |
| WO | 2008042111 A2 | 4/2008 |

OTHER PUBLICATIONS

Chockler, G.V., "An Implementation of Reliable Multicast Services in the Transis Group Communication System," Lab Project, The Hebrew University of Jerusalem, Jerusalem, Israel, Oct. 5, 1997, 31 pages.

Dolev, D., "The Transis Approach to High Availability Cluster Communication," Communications of the ACM, Apr. 1996, vol. 39, 13 pages.

European Search Report in European Application No. 14164824.6, dated Sep. 16, 2014, dated Sep. 24, 2014.

Gemmell, J., et al., "In Search of an API for Scalable Reliable Multicast," Technical Report MSR-TR-97-17, Microsoft Corporation, Jun. 23, 1997, pp. 1-14.

(56) References Cited

OTHER PUBLICATIONS

Guerraoui, R., et al., "Total Order Multicast to Multiple Groups," *Proceedings of the 17th IEEE International Conference on Distributed Computing Systems*, Baltimore, Maryland, USA, May 27-30, 1997, IEEE Computer Society, 1997, 9 pages.
International Search Report and Written Opinion of International Application No. PCT/US2012/053169, dated Jan. 15, 2013 (dated Jan. 22, 2013).
Koifman, A., et al., "RAMP: A Reliable Adaptive Multicast Protocol," TASC, Inc., 1996, 27 pages.
Koifman, A., et al., "RAMP: A Reliable Adaptive Multicast Protocol," *Proceedings of the INFOCOM 19996, 15th Annual Joint Conference of the IEEE Computer Societies, San Francisco, California, USA*, Mar. 24-28, 1996, IEEE Computer Society, 1996, 16 pages.
Sabata, B., et al., "Transport Protocol for Reliable Multicast: TRM," *Proceedings of the International Conference on Networks*, Jan. 8-10, 1996, Orlando, Florida, USA, 1996, 3 pages.
Singapore Search Report and Written Opinion in Singapore Patent Application No. 2014011753 by the Danish Patent and Trademark Office, dated Mar. 6, 2015, dated Mar. 27, 2015.
Speakman, T., et al., "PGM Reliable Transport Specification," Network Working Group, Request for Comments No. 3208, The Internet Society, 2001, 112 pages.

\* cited by examiner

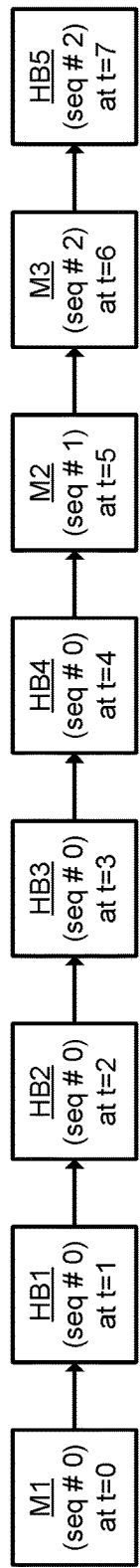
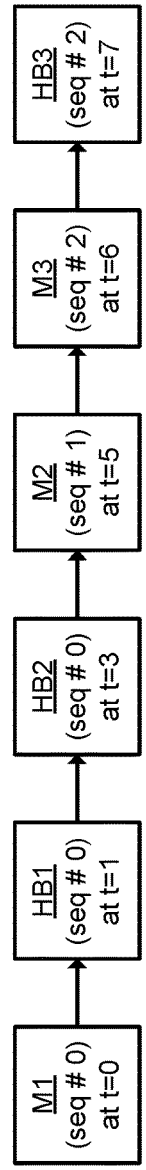
FIG. 4A
FIG. 4B

ORDER FEED MESSAGE STREAM INTEGRITY

CROSS REFERENCE TO RELATED APPLICATIONS

This application is a continuation of U.S. patent application Ser. No. 14/840,787, filed Aug. 31, 2015, now U.S. Pat. No. 10,152,751, which is a continuation of U.S. patent application Ser. No. 14/260,768, filed Apr. 24, 2014, now U.S. Pat. No. 9,154,393, which is a continuation of U.S. patent application Ser. No. 13/225,047, filed Sep. 2, 2011, now U.S. Pat. No. 8,745,157, entitled "Order Feed Message Stream Integrity," the contents of each of which are fully incorporated herein by reference for all purposes.

BACKGROUND

An electronic trading system generally includes a trading device in communication with an electronic exchange. The electronic exchange transmits market data to the trading device. Market data includes, for example, price data, market depth data, last traded quantity data, and/or any data related to a market for a tradeable object. In some electronic trading systems, the trading device sends trade orders to the electronic exchange. In another example, a server device, on behalf of the trading device, sends the trade orders to the electronic exchange. Upon receiving a trade order, the electronic exchange enters the trade order into an exchange order book and attempts to match quantity of the trade order with quantity of one or more contra-side trade orders.

Users of market data depend on up-to-date market data and information about trade orders to make informed trades. Thus, it is desirable to maintain the integrity of the message stream containing such market data and trade order information. Detection of lost messages related to market data and trade orders and reduction of message stream data are beneficial in the environment of electronic trading.

BRIEF DESCRIPTION OF THE DRAWINGS

Certain embodiments are disclosed with reference to the following drawings.

FIG. 4A illustrates example messages using a heartbeat with fixed intervals technique.

FIG. 4B illustrates example messages using a heartbeat with increasing intervals technique.

Figure 1:
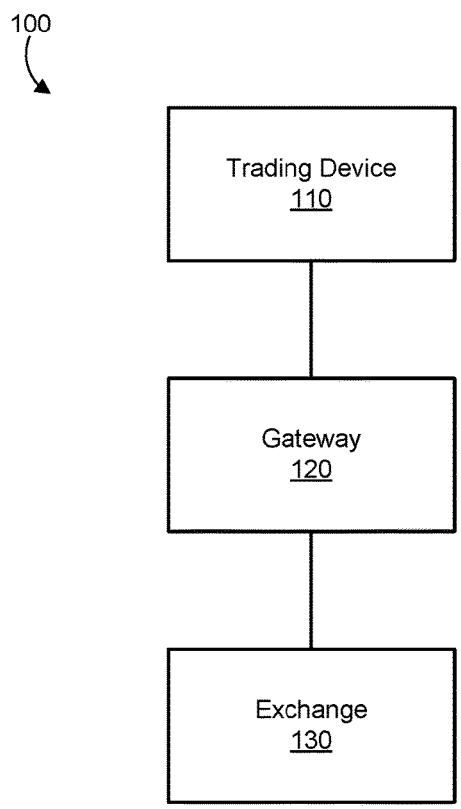
FIG. 1 illustrates a block diagram of an electronic trading system in which certain embodiments may be employed.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

Users rely on up-to-date market data and information about trade orders to make informed trades. Thus, it is desirable to maintain the integrity of the message stream containing market data and trade order information in an electronic trading environment. A message stream is a logical communications channel for related messages. Detection of lost messages, particularly those messages containing data, improves message stream integrity. If a message is lost, various actions may be taken, such as requesting retransmission of the lost message, closing down or resetting the message stream, creating an entry in a log file, providing an error message, generating an interrupt, alerting an application or higher-level protocol processing the received data about the lost message, aborting program execution, aborting a trading algorithm, notifying one or more users that a message was lost, terminating the message stream and establishing a new message stream, releasing and re-acquiring a license, re-authenticating with a server, and/or re-downloading the full order book.

Additionally, state information needs to be stored to maintain a message stream and the message stream integrity. State information may be stored at the sender and receiver as well as intermediate devices. This state information may consume limited resources, such as memory. Thus, it is desirable to reduce the state information that needs to be stored for message streams.

To detect lost messages, some current systems use a sequence number or message identifier which is incremented by a predetermined amount for each message so that a recipient may determine both the order in which the messages were sent and whether any messages were lost. However, when messages are sent infrequently, there may be an unacceptable delay before a lost message is detected.

Some current systems utilize heartbeat messages to increase the likelihood of detecting lost messages. Heartbeat messages may be sent at a fixed interval to detect a lost message in a reasonable amount of time. However, the sending of a large number of heartbeat messages may inefficiently use limited network bandwidth and/or increase latency for the delivery of other data messages on the network.

The disclosed embodiments relate to techniques for improving message stream integrity by detecting lost messages and reducing the state information stored for message streams. In some embodiments, a heartbeat with increasing intervals technique is used to increase the likelihood of detecting lost messages while reducing network traffic due to heartbeat messages. In some embodiments, a stop message technique is implemented to increase the likelihood of detecting lost messages while reducing excessive non-data network traffic. In some embodiments, a message stream state clearing technique is implemented to reduce state information stored for message streams and, thus, memory usage. In some embodiments, a phase number technique is implemented to increase the likelihood of detecting lost messages.

Although the following discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

I. Brief Description

Certain embodiments provide a method including sending, by a computing device, a first data message; sending, by the computing device, a first stop message; and sending, by the computing device, a second data message. The first data message includes data related to an order for a tradeable object. The first data message includes a first data message sequence number with a value of a predefined initial sequence number. The first data message includes a first data message phase number. The first stop message includes a stop message phase number. The stop message phase number is the same as the first data message phase number. The second data message is sent after the first stop message. The second data message includes data related to the order. The second data message includes a second data message sequence number with a value of the predefined initial sequence number. The second data message includes a second data message phase number. The second data message phase number is different than the first data message phase number.

Certain embodiments provide a tangible computer readable storage medium including instructions that, when executed, cause a computing device to at least send a first data message; send a first stop message; and send a second data message. The first data message includes data related to an order for a tradeable object. The first data message includes a first data message sequence number with a value of a predefined initial sequence number. The first data message includes a first data message phase number. The first stop message includes a stop message phase number. The stop message phase number is the same as the first data message phase number. The second data message is sent after the first stop message. The second data message includes data related to the order. The second data message includes a second data message sequence number with a value of the predefined initial sequence number. The second data message includes a second data message phase number. The second data message phase number is different than the first data message phase number.

Certain embodiments provide a system including a first data message sender to send a first data message; a first stop message sender to send a first stop message; and a second data message sender to send a second data message. The first data message includes data related to an order for a tradeable object. The first data message includes a first data message sequence number with a value of a predefined initial sequence number. The first data message includes a first data message phase number. The first stop message includes a stop message phase number. The stop message phase number is the same as the first data message phase number. The second data message is sent after the first stop message. The second data message includes data related to the order. The second data message includes a second data message sequence number with a value of the predefined initial sequence number. The second data message includes a second data message phase number. The second data message phase number is different than the first data message phase number.

Certain embodiments provide a system including a phase number generator to provide a phase number for a message; a sequence number generator to provide a sequence number for the message; a first data message sender to send a first data message; a first stop message sender to send a first stop message; and a second data message sender to send a second data message. The first data message includes data related to an order for a tradeable object. The first data message includes a first data message sequence number provided by the sequence number generator with a value of a predefined initial sequence number. The first data message includes a first data message phase number provided by the phase number generator. The first stop message includes a stop message phase number provided by the phase number generator. The stop message phase number is the same as the first data message phase number. The second data message is sent after the first stop message. The second data message includes data related to the order. The second data message includes a second data message sequence number provided by the sequence number generator with a value of the predefined initial sequence number. The second data message includes a second data message phase number provided by the phase number generator. The second data message phase number is different than the first data message phase number.

Certain embodiments provide a method including detecting, by a computing device, a new message is to be sent; determining, by the computing device, a phase number for the new message; determining, by the computing device, a sequence number for the new message; and sending, by the computing device, the new message with the phase number and the sequence number.

Certain embodiments provide a tangible computer readable storage medium including instructions that, when executed, cause a computing device to at least detect a new message is to be sent; determine a phase number for the new message; determine a sequence number for the new message; and send the new message with the phase number and the sequence number.

Certain embodiments provide a system including a new message detector to detect a new message is to be sent; a phase number generator to determine a phase number for the new message; a sequence number generator to determine a sequence number for the new message; and a message sender to send the new message with the phase number and the sequence number.

Certain embodiments provide a method including receiving, by a computing device, a new message including a message phase number and a message sequence number; determining, by the computing device, an expected phase number for the new message; determining, by the computing device, an expected sequence number for the new message; comparing, by the computing device, the message phase number to the expected phase number; comparing, by the computing device, the message sequence number to the expected sequence number; and reporting, by the computing device, a lost message when at least one of (a) the message phase number and the expected phase number and (b) the message sequence number and the expected sequence number do not match.

Certain embodiments provide a tangible computer readable storage medium including instructions that, when executed, cause a computing device to at least receive a new message including a message phase number and a message sequence number; determine an expected phase number for the new message; determine an expected sequence number for the new message; compare the message phase number to the expected phase number; compare the message sequence number to the expected sequence number; and report a lost message when at least one of (a) the message phase number and the expected phase number and (b) the message sequence number and the expected sequence number do not match.

Certain embodiments provide a system including a message receiver to receive a new message including a message phase number and a message sequence number; an expected phase number generator to determine an expected phase number for the new message; an expected sequence number generator to determine an expected sequence number for the new message; a phase number comparator to compare the message phase number to the expected phase number; a sequence number comparator to compare the message sequence number to the expected sequence number; and a lost message reporter to report a lost message when at least one of (a) the message phase number and the expected phase number and (b) the message sequence number and the expected sequence number do not match.

Certain embodiments provide a method including sending, by a computing device, a first data message; sending, by the computing device, a first heartbeat message; and sending, by the computing device, a second heartbeat message. The first heartbeat message is sent at a first time interval after the first data message is sent. The first time interval is of a predefined length. The second heartbeat message is sent at a second time interval after the first heartbeat message is sent. The second time interval is increased from the first time interval.

Certain embodiments provide a tangible computer readable storage medium including instructions that, when executed, cause a computing device to at least send a first data message; send a first heartbeat message; and send a second heartbeat message. The first heartbeat message is sent at a first time interval after the first data message is sent. The first time interval is of a predefined length. The second heartbeat message is sent at a second time interval after the first heartbeat message is sent. The second time interval is increased from the first time interval.

Certain embodiments provide a system including a first data message sender to send a first data message; a first heartbeat message sender to send a first heartbeat message; and a second heartbeat message sender to send a second heartbeat message. The first heartbeat message is sent at a first time interval after the first data message is sent. The first time interval is of a predefined length. The second heartbeat message is sent at a second time interval after the first heartbeat message is sent. The second time interval is increased from the first time interval.

Certain embodiments provide a method including sending, by a computing device, a first data message; and sending, by the computing device, a first stop message.

Certain embodiments provide a tangible computer readable storage medium including instructions that, when executed, cause a computing device to at least send a first data message; and send a first stop message.

Certain embodiments provide a system including a first data message sender to send a first data message; and a first stop message sender to send a first stop message.

Certain embodiments provide a method including sending, by a computing device, a message including a sequence number and a phase number.

Certain embodiments provide a tangible computer readable storage medium including instructions that, when executed, cause a computing device to at least send a message including a sequence number and a phase number.

Certain embodiments provide a system including a message sender to send a message including a sequence number and a phase number.

Certain embodiments provide a method including receiving, by a computing device, a message including a sequence number and a phase number; and reporting, by the computing device, a lost message based on the sequence number and the phase number.

Certain embodiments provide a tangible computer readable storage medium including instructions that, when executed, cause a computing device to at least receive a message including a sequence number and a phase number; and report a lost message based on the sequence number and the phase number.

Certain embodiments provide a system including a message receiver to receive a message including a sequence number and a phase number; and a lost message reporter to report a lost message based on the sequence number and the phase number.

II. Example Electronic Trading System

FIG. 1 illustrates a block diagram of an electronic trading system 100 in which certain embodiments may be employed. The system 100 includes a trading device 110, a gateway 120, and an electronic exchange 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. In addition, market data is sent from the exchange 130 through the gateway 120 to the trading device 110. The user may also utilize the trading device 110 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 110. There may be a real tradeable object that corresponds and/or is similar to a synthetic trading object.

The trading device 110 may include one or more electronic computing platforms such as a hand-held device, laptop, desktop computer, workstation with a single or multi-core processor, server with multiple processors, and/or cluster of computers, for example. For example, while logically represented as a single device, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 may include an electronic trading workstation, a portable trading device, an algorithmic trading system such as a "black box" or "grey box" system, an embedded trading system, and/or an automated trading tool, for example. For example, the trading device 110 may be a computing system running a copy of X_TRADER®, an electronic trading platform provided by Trading Technologies International, Inc. of Chicago, Ill. As another example, the trading device 110 may be a computing device running an automated trading tool such as Autospreader® and/or Autotrader™, also provided by Trading Technologies International, Inc.

As another example, the trading device 110 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into the computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment that does not effectuate real-world trades.

The orders sent by the trading device 110 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the order based on fill confirmations received from the exchange 130, for example. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

In general, the exchange 130 may be owned, operated, controlled, or used by an exchange entity. Example exchange entities include the CME Group, the London International Financial Futures and Options Exchange ("LIFFE"), the IntercontinentalExchange ("ICE"), and Eurex. The exchange 130 may include an electronic matching system, such as a computer, server, or other computing device, that is adapted to allow tradeable objects, for example, offered for trading by the exchange, to be bought and sold. The electronic matching system may include a matching engine, for example. The exchange 130 may include separate entities, some which list and/or administer tradeable objects and others which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system, for example. The market data may be provided to the trading device 110, for example. The market data may be provided to the trading device 110 through the gateway 120, for example. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information.

In certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

Figure 2:
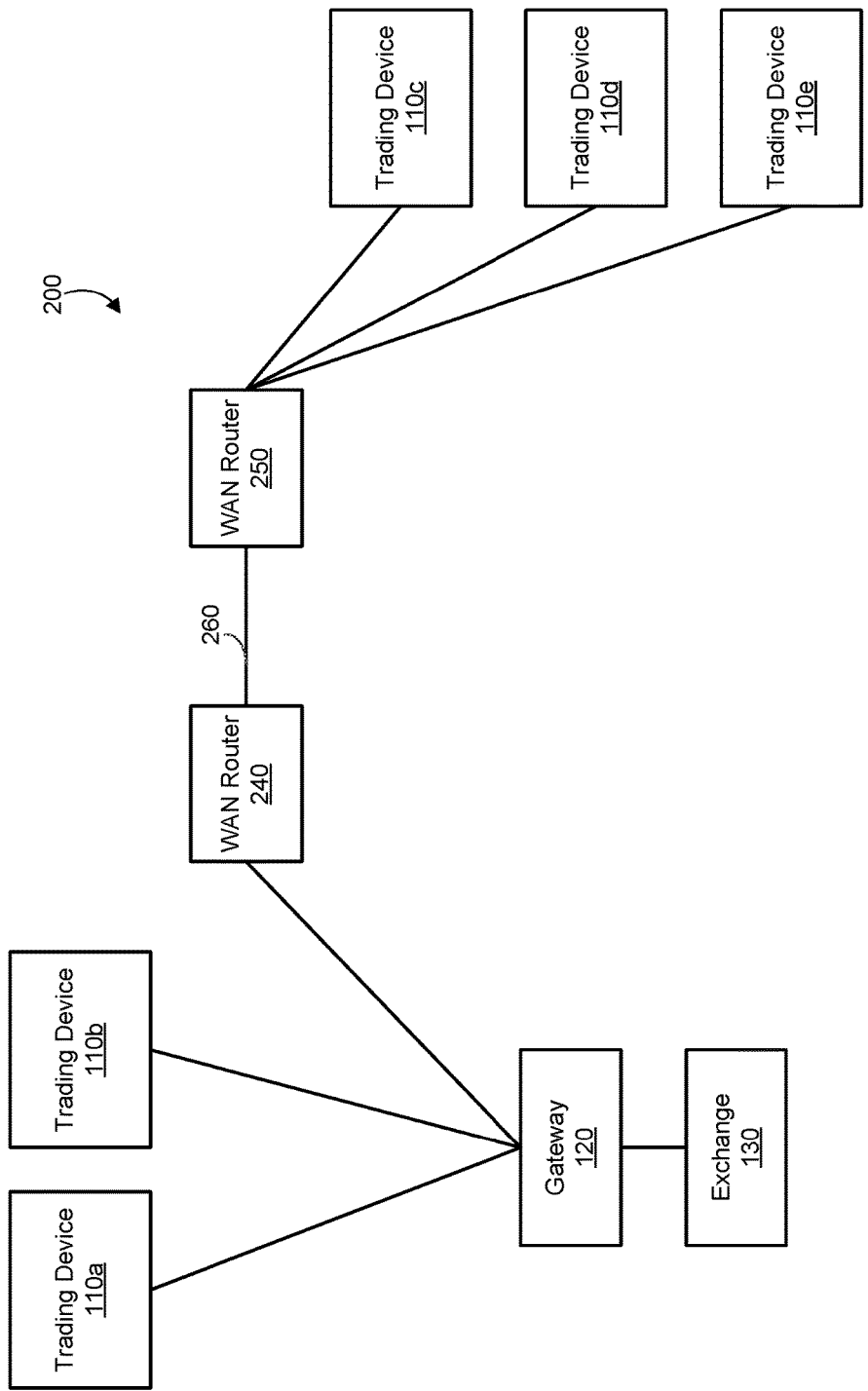
FIG. 2 illustrates a block diagram of an example electronic trading system of FIG. 1.

FIG. 2 illustrates an example implementation 200 of the electronic trading system 100 of FIG. 1. The system 200 includes trading devices 110a-110e, a gateway 120, an electronic exchange 130, a first WAN router 240, a second WAN router 250, and a WAN link 260. The trading devices 110a and 110b are in communication with the gateway 120. The gateway 120 is in communication with the exchange 130. The trading devices 110c-110e communicate with the gateway 120 using the WAN router 240 and the WAN router 250.

In operation, the trading devices 110a-110e may send orders to buy or sell tradeable objects at the exchange 130. For example, a user may utilize the trading devices 110a-110e to send the orders. The orders are sent from trading devices 110a and 110b through the gateway 120 to the exchange 130. The orders are sent from the trading devices 110c-110e through the WAN routers 250 and 240 to the gateway 120 and through the gateway 120 to the exchange 130. In addition, market data is sent from the exchange 130 through the gateway 120 to the trading devices 110a and 110b and the WAN router 240. Market data is sent from the WAN router 240 to the WAN router 250 and then from the WAN router 250 to the trading devices 110c-110e.

In the example implementation 200 of the electronic trading system 100, message delay and/or loss may occur at the WAN router 240, for example. The message delay and/or loss may be due to, for example, the WAN router 240 dropping a message or due to a failure of WAN router 240, WAN router 250, and/or WAN link 260. For example, the WAN router 240 may drop a message due to limited resources, such as running out of memory or processing capacity and/or because of delays in transmitting messages across WAN link 260. As another example, WAN router 240 and/or WAN router 250 might fail due to power loss or hardware failure. As another example, WAN link 260 might fail because of a severed cable or hardware failure.

III. Example Computing Device

Figure 3:
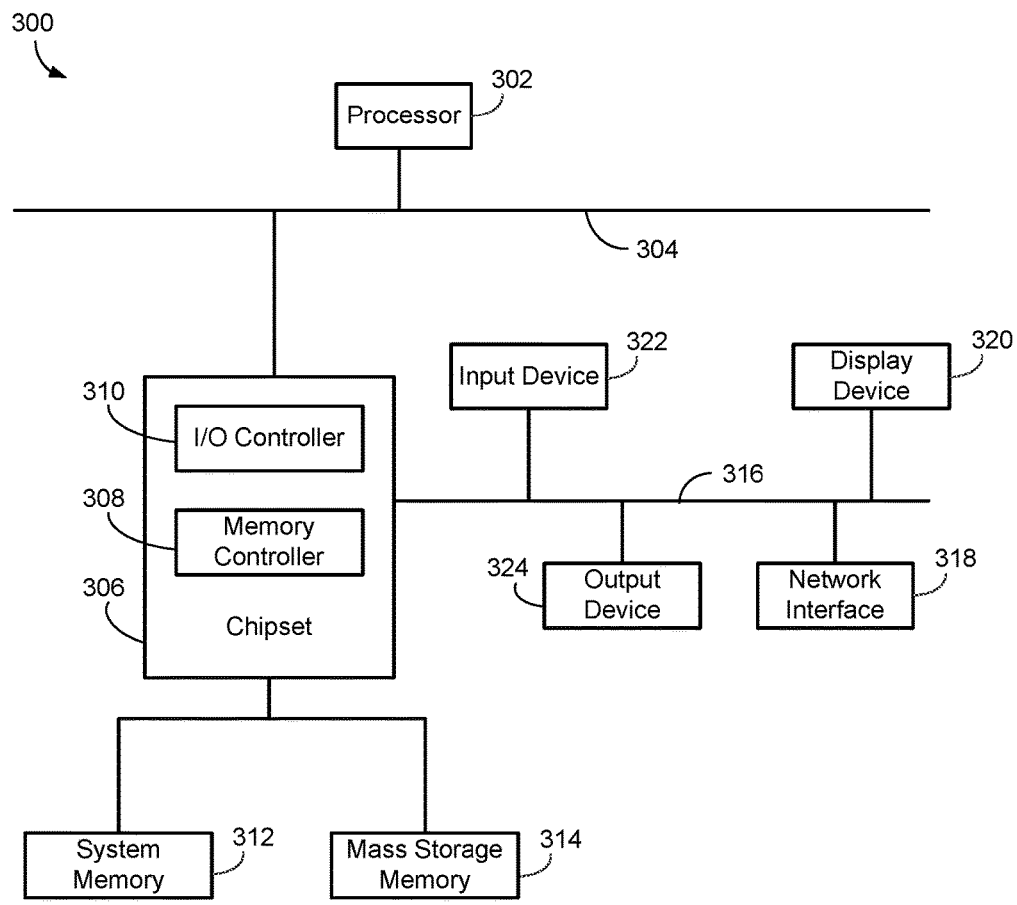
FIG. 3 illustrates a block diagram of a computing device according to certain embodiments.

FIG. 3 illustrates a block diagram of an example computing device 300 that may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a processor 302, an interconnection bus 304, a chipset 306, a memory controller 308, an input/out (I/O) controller 310, a system memory 312, a mass storage memory 314, an I/O bus 316, a network interface 318, a display 320, an input device 322, and an output device 324. The computing device 300 may include additional, different, or fewer components. For example, multiple buses, multiple processors, multiple memory devices, multiple network interfaces, multiple display devices, multiple input devices, multiple output devices, or any combination thereof, may be provided. As another example, the computing device 300 may not include an output device 324 separate from the display device 320. As another example, the computing device 300 may not include a display device 320. As another example, the computing device 300 may not include an input device 322. Instead, for example, the computing device 300 may be controlled by an external or remote input device via the network interface 318.

The computing device 300 includes a processor 302 that is coupled to an interconnection bus 304. The interconnection bus 304 may include a communication bus, channel, network, circuit, switch, fabric, or other mechanism for communicating data between components in the computing device 300. The interconnection bus 304 may be communicatively coupled with and transfer data between any of the components of the computing device 300. For example, during an installation process of a trading application, one or more computer-readable instructions that are to be executed by the processor 302 may be transferred from the input device 322 and/or the network interface 318 to the system memory 312 and/or the mass storage memory 314. When the computing device 300 is running or preparing to run the trading application stored in the system memory 312 and/or the mass storage memory 314, the processor 302 may retrieve the instructions from the system memory 312 and/or the mass storage memory 314 via the interconnection bus 304.

The processor 302 may be a processor, processing unit, or microprocessor, for example. The processor 302 may include one or more general processors, digital signal processors, application specific integrated circuits, field programmable gate arrays, analog circuits, digital circuits, programmed processors, and/or combinations thereof, for example. The processor 302 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 300 may be a multi-processor system and, thus, may include one or more additional processors that are communicatively coupled to the interconnection bus 304.

The processor 302 may be operable to execute logic encoded in one or more tangible media, such as the system memory 312, the mass storage memory 314, and/or via the network interface 318. As used herein, logic encoded in one or more tangible media includes instructions that are executable by the processor 302 or a different processor. The logic may be stored as part of software, hardware, integrated circuits, firmware, and/or micro-code, for example. The logic may be received from an external communication device via a communication network, for example, connected to the Internet. The processor 302 may execute the logic to perform the functions, acts, or tasks illustrated in the figures or described herein.

The processor 302 of FIG. 3 is coupled to the chipset 306, which includes the memory controller 308 and the I/O controller 310. A chipset typically provides I/O and memory management functions as well as a plurality of general purpose and/or special purpose registers and timers that are accessible or used by one or more processors coupled to the chipset 306. The memory controller 308 performs functions that enable the processor 302 (or processors if there are multiple processors) to access the system memory 312 and the mass storage memory 314.

The system memory 312 and the mass storage memory 314 may be one or more tangible media, such as computer readable storage media, for example. The system memory 314 may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 314 may include various types of mass storage devices including, for example, a hard disk drive, optical media, magnetic tape, any other tangible data storage device, or any combination thereof. In certain embodiments, the system memory 312 and the mass storage memory 314 are non-transitory.

The system memory 312 and the mass storage memory 314 may be a single memory module, for example. The system memory 312 and the mass storage memory 314 may be adjacent to, part of, programmed with, networked with, and/or remote from processor 302, such that data stored in the system memory 312 and the mass storage memory 314 may be retrieved and processed by the processor 302, for example. The system memory 312 and the mass storage memory 314 may store instructions that are executable by the processor 302. The instructions may be executed to perform one or more of the acts or functions described herein or shown in the figures.

The I/O controller 310 performs functions that enable the processor 302 to communicate with the network interface 318, the display 320, the input device 322, and the output device 324 through an I/O bus 316. While the memory controller 308 and the I/O controller 310 are depicted in FIG. 3 as separate blocks within the chipset 306, the functions performed by these blocks may be integrated within a single semiconductor circuit or may be implemented using two or more separate integrated circuits. One or more of the components of the computing device 300 may be implemented as a system on a chip (for example, a system on a chip in an IPHONE™).

The network interface 318 may be a one-way or two-way communication coupling. Accordingly, the network interface 318 may communicatively connect one, two, or more communication networks or devices. For example, the interconnection bus 304 may be coupled with a gateway similar to gateway 120 of FIG. 1 discussed above via the network interface 318, such that one, some, or all of the components of the computing device 300 are accessible or may communicate with the gateway. As another example, the network interface 318 may couple the interconnection bus 304 with other communication networks. The network interface 318 may be, for example, an integrated services digital network (ISDN) card or a modem to provide a data communication connection. As another example, network interface 318 may be a local area network (LAN) card to provide a data communication connection to a compatible LAN, for example, connected to the Internet. Wireless links may also be implemented. The network interface 318 may send and receive electrical, electromagnetic, or optical signals that carry analog or digital data streams representing various type of information, for example.

The display device 320 may include a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, and/or transparent display device, for example.

The display device 320 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 320 and/or the input device 322 may be used to interact with the trading screen, for example.

The input device 322 may include a keyboard, mouse, microphone, touch-screen, trackball, keypad, joystick, and/or other device for providing input, for example. The input device 322 may be used, for example, to provide command selections to processor 302. For example, the input device 322 may be a mouse that is used to control a cursor displayed on a trading screen. The mouse may include one or more buttons for selection and control, for example.

The output device 324 may include a keyboard, mouse, speakers, touch-screen, trackball, keypad, haptic device or system, joystick, and/or other device for providing output, for example. For example, the output device 324 may be used to output one or more signals, such as a haptic signal or an audio signal, to a user. While the input device 322 and output device 324 are depicted in FIG. 3 as separate blocks, the functions performed by these blocks may be integrated into a single I/O device.

IV. Message Stream Integrity Techniques

In some electronic trading systems, an electronic exchange transmits messages related to market data to a trading device. Market data includes, for example, price data, market depth data, last traded quantity data, and/or any data related to a market for a tradeable object. In some electronic trading systems, the trading device sends messages related to trade orders to the electronic exchange. Upon receiving a trade order, the electronic exchange enters the trade order into an exchange order book and attempts to match quantity of the trade order with quantity of one or more contra-side trade orders.

Users rely on the messages being sent and delivered to be up-to-date and accurate to make informed decisions regarding potential trades. Messages may be delayed and/or lost due to, for example, an intermediate device dropping the message, a link failure, insufficient resources (for example, memory or processing), or an intermediate device crashing or resetting. Thus, detection of lost messages that failed to be sent or received properly is desirable to maintaining the integrity of message streams in an electronic trading system.

When a message is determined to be lost, various actions may be taken, such as requesting retransmission of the lost message, closing down or resetting the message stream, creating an entry in a log file, providing an error message, generating an interrupt, alerting an application or higher-level protocol processing the received data about the lost message, aborting program execution, aborting a trading algorithm, notifying one or more users that a message was lost, terminating the message stream and establishing a new message stream, releasing and re-acquiring a license, re-authenticating with a server, and/or re-downloading the full order book.

Some current systems use a sequence number or message identifier to aid in lost message detection. The sequence number or message identifier is changed (typically, incremented) by a predetermined amount for each message to allow a recipient to determine both the order in which the messages were sent and whether any messages were lost. The recipient may buffer messages that may be received out of order due to, for example, network behaviors. When a message is not received, it may be viewed as being missing. It is possible the missing message may be received at a later time, for example, because it was re-ordered at an intermediate device or due to a retransmission. If, after a period of time, a missing message in the sequence is not received, the recipient may determine that the message was lost. In another example, rather than waiting a period of time to potentially receive an earlier message when a later message is received out of order, the missing earlier message may be determined to be lost upon receipt of the later, out of order message.

In some systems, messages may be sent infrequently. For example, information about the state of an order may be sent only when there is a change in the state of that order. State changes for an order may include fills, partial fills, a change in order price, or an order being cancelled, for example. If the order is working away from the market, for example, its state may not change over the course of an hour or more. In some cases, the order may be an order not currently working in the market, such as triggered orders, and the state may not change over hours or days. Such triggered orders may include, for example, hold, good till canceled ("GTC"), good till date ("GTD"), limit-if-touched, market-if-touched, limit-on-close, market-on-close, limit-on-open, and market-on-open orders. "GTC" orders retain an active set price until it is canceled or executed. "GTD" orders remain active until a set date. Orders which have been filled are also not currently working in the market.

As another example, information about server-related state changes, such as whether the server is accessible or inaccessible and whether the connection to the exchange is accessible or inaccessible, may be infrequently sent. As another example, non-order related messages, such as news messages, may be sent infrequently. As another example, file and initial order book downloads may occur infrequently, such as at start-up and when lost messages are subsequently detected. A single trader may not necessarily place a large number of orders, but if an order book is shared by multiple users, in combination, a large number of orders or other types of state related to the shared order book may have infrequently sent information. For example, an administrator, such as a risk manager, may have access to the order books of every trader. As another example, all traders at a particular firm may share an order book because they trade on the same account at the exchange. In cases with shared order books, each recipient sharing the order book may potentially receive messages related to the order book.

Where message stream integrity depends on detecting lost messages based on the sequence number of a later-received message, infrequently sent messages may result in unacceptable delays before a lost message is detected. For example, if a message regarding a first change in the state of a working order is sent, but lost, the recipient may not detect the lost message until after another message regarding a second change in the state of the working order is received. If messages are sent infrequently, the second message may be received hours after the first message was lost. As another example, where there is no second change in state, the first message loss may not be detected. Thus, during the time between the loss of the first message and the detection of the lost message, the recipient has been using incorrect data about the state of the working order, which is highly undesirable in an electronic trading environment. For example, using incorrect data about the state of a working order may cause risk and/or profit or loss information to be incorrect. As another example, if a fill message is lost, a trader's position may be different from what the trader believes it is and the trader may not hedge as desired and/or the trader may believe he is flat, exposing him to even more potential risk.

A. Heartbeat with Fixed Intervals Technique

One technique used by current systems for increasing the likelihood of detecting a lost message is to send messages at some defined interval regardless of whether there is new data to be sent. Such a situation might arise where there has been no change in the state of an order and, thus, there is no new data to send. Systems using this technique send a heartbeat message if a certain period of time has elapsed since, for example, the last message was sent. Heartbeat messages may also be referred to as alive messages, keep-alive messages, status messages, or synchronization messages, for example. The heartbeat with fixed intervals technique is illustrated in the example messages of FIG. 4A.

FIG. 4A illustrates example messages utilizing the heartbeat with fixed intervals technique where the defined time interval is "1." In this example, data messages are denoted as "M" and heartbeat messages are denoted as "HB." Here, the sequence number of each data message is increased by one. In this example, the first data message M1 is sent with a sequence number of "0" at time t=0. Because the defined time interval is "1," and no new data is to be sent within this time interval, the system sends the first heartbeat message HB1 with sequence number "0" at time t=1. In this example, the heartbeat messages repeat the sequence number of the last data message sent. In certain embodiments, the heartbeat messages may be assigned their own sequence numbers.

At time t=2, where there is no new data to be sent, the system sends the second heartbeat message HB2 with sequence number "0," the same sequence number as data message M1, the last data message sent. At time t=3, where there is no new data to be sent, the system sends the third heartbeat message HB3 with sequence number "0." At time t=4, where there is no new data to be sent, the system sends the fourth heartbeat message HB4 with sequence number "0." At time t=5, there is new data to be sent. Thus, the system sends the second data message M2 and increases the sequence number to "1." At time t=6, there is new data to be sent. Thus, the system sends the third data message M3 and increases the sequence number to "2." At time t=7, where there is no new data to be sent, the system sends the fourth heartbeat message HB5 with sequence number "2," the same sequence number as data message M3, the last data message sent.

By sending heartbeat messages at a defined interval, such as "1," the system is able to provide a bound on the amount of time between a message being lost and detection of the lost message. The system is able to provide a bound on the detection of the lost message because the recipient knows the defined time interval and may detect if a message is not received within the defined interval. In this example, if data message M3 was lost, the system next receives heartbeat message HB5 with sequence number "2." The system would compare the sequence number of the received heartbeat message, "2," with the sequence number of the last received message; here data message M2 with sequence number "1." Because in this example heartbeat messages retain the sequence number of the previously sent data message, the system would detect a lost message within the defined time interval of "1." In another example, the recipient may detect if a message is not received within some length of time greater than the defined time interval, such as a small, constant amount of time or double the defined interval, to allow for network delay variations.

However, in a heartbeat system with a defined time interval as described above, where there may be a large number of infrequently updated orders or other state information, there will be a corresponding large number of heartbeat messages. The large number of heartbeat messages may inefficiently use limited network bandwidth and/or increase latency for the delivery of other data messages on the network. For example, if a particular gateway is running an order server and a filler server and handling 1,500 users, where there are two endpoints for each user, there are 3,000 endpoints being handled by the gateway. If there is no order activity or other state information, 3,000 heartbeat messages may be needed each second, inefficiently using limited network bandwidth and taking away and/or delaying access to processing capability for information being received from an exchange or active traders.

B. Heartbeat with Increasing Intervals Technique

Certain embodiments address this issue of excessive non-data network traffic by providing an increasing interval between heartbeat messages. For example, a first heartbeat may be sent a fixed amount of time after the last data message was sent. Subsequent heartbeat messages may then be sent after increasing time intervals. For example, the interval may be increased by a fixed amount, doubled, geometrically increased, exponentially increased, or increased by a predefined amount such as varying fixed intervals or based on a sequence such as Fibonacci or prime numbers. To improve the effective detection of lost messages, the interval may be capped or limited to a maximum value. Capping or limiting the interval to a maximum value prevents the time interval from becoming effectively unbounded and maintains a bound on the amount of time between a message being lost and detection of the lost message.

FIG. 4B illustrates example messages utilizing an example heartbeat with increasing intervals technique where the time interval is doubled. In this example, data messages are denoted as "M" and heartbeat messages are denoted as "HB." Here, the sequence number of each data message is increased by one and heartbeat messages include the sequence number of the last data message sent. In this example, a first data message M1 is sent with a sequence number of "0" at time t=0. The first time interval is "1," and no new data is to be sent within this time interval. Thus, the system sends a first heartbeat message HB1 with sequence number "0" at time t=1.

In this example, the time interval is doubled and, thus the next heartbeat message is to be sent at time t=3 (t=1 (time of last heartbeat message sent)+1 (prior interval)*2 (doubling)), double the amount of the previous time interval of "1." At time t=3, where there is no new data to be sent, the system sends a second heartbeat message HB2 with sequence number "0," the same sequence number as data message M1, the last data message sent. The next heartbeat message is to be sent at time t=7 (t=3 (time of last heartbeat message sent)+2 (prior interval)*2 (doubling)), double the amount of the previous time interval of "2." However, at time t=5, there is new data to be sent. Thus, the system sends a second data message M2 and increases the sequence number to "1." At time t=6, there is new data to be sent and, thus the system sends a third data message M3 and increases the sequence number to "2." The next heartbeat message is to be sent at time t=7, returning to the initial time interval, "1." At time t=7, where there is no new data to be sent, the system sends a third heartbeat message HB3 with sequence number "2," the same sequence number as data message M3, the last data message sent.

The increasing interval technique described in FIG. 4B above reduces network traffic due to heartbeat messages when compared to fixed heartbeat intervals, where the fixed heartbeat interval as described in FIG. 4A above is the same as the initial interval of the increasing interval technique. In the example of FIG. 4A, four heartbeat messages are sent in between two data messages (M1 and M2) where in this example, only two heartbeat messages are sent.

Additionally, the increasing interval technique provides some tolerance to transient link failures. For example, if a link goes down and the connectivity is restored during the increased interval, and no new messages are sent, then the transient link failure would not be detected. A fixed interval technique may be more likely to detect such transient link failures, though such failures may not be problematic for stream integrity because no data is lost.

Figure 4C:
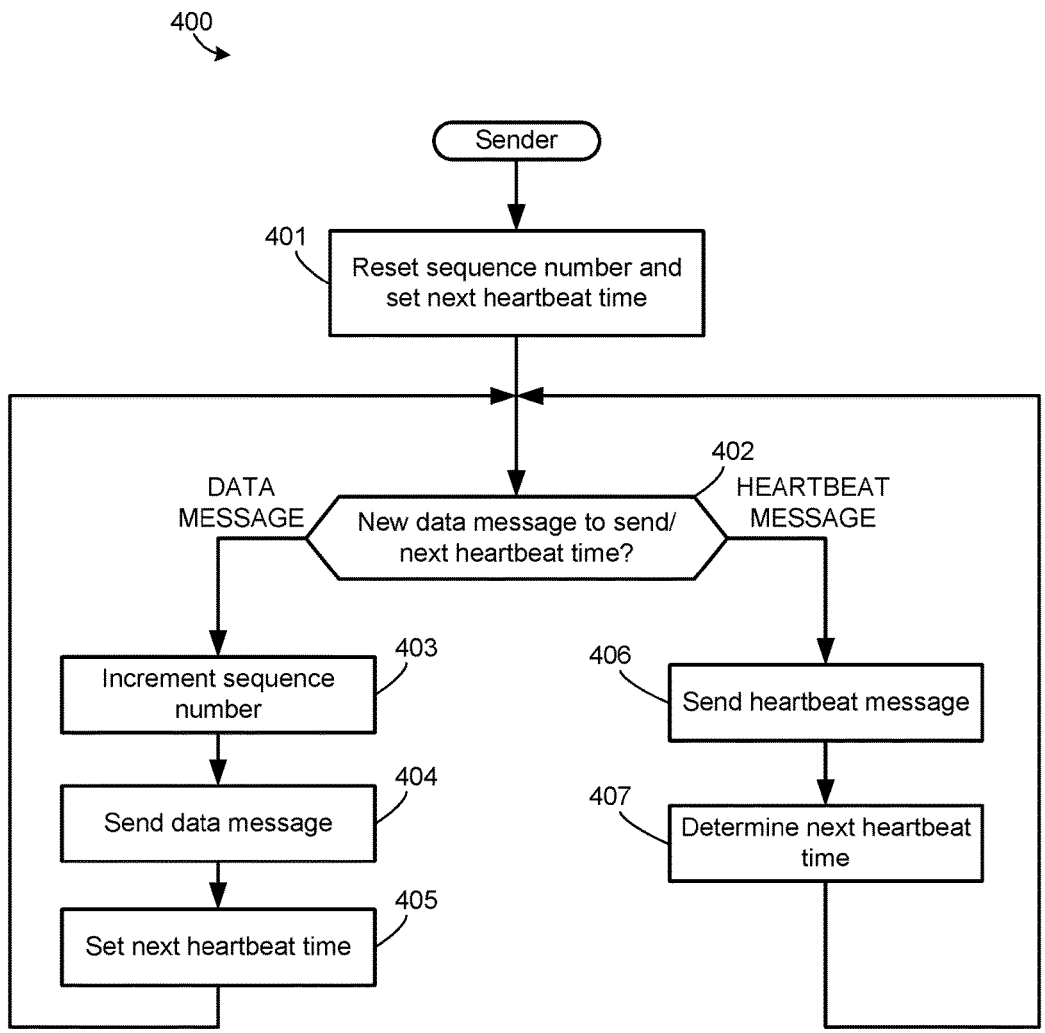
FIG. 4C illustrates a flow diagram of an example method for sending messages according to FIGS. 4A-4B.

FIG. 4C illustrates an example flow diagram 400 of a method for sending messages according to the heartbeat with increasing intervals technique described above. In this example, each data message has a different sequence number. For example, each data message may have a sequence number that is one greater than the previous data message's sequence number. In this example, heartbeat messages use the same sequence number as the last data message sent before the heartbeat.

At block 401, a sequence number for a message to be sent is reset and a next heartbeat time, representing the time at which a heartbeat message should be sent, is set. For example, the sequence number may be reset to "0" or "−1" and the next heartbeat time may be set to "infinity" because no data message has been sent yet.

At block 402, it is determined if a new data message is to be sent or if the next heartbeat time has been reached. For example, a new data message to send may be received from an application. As another example, a timer associated with the next heartbeat time may expire.

If a new data message is to be sent (as determined at block 402), at block 403, the sequence number for the message to be sent is incremented. For example, the sequence number may be incremented by 1 from "0" to "1" or from "−1" to "0."

At block 404, the new data message is sent with the incremented sequence number, such as the data message M1 of FIG. 4B.

At block 405 the next heartbeat time is set to be the time the new data message was sent plus the initial interval (and any previously-set next heartbeat time is cleared). For example, if the new data message was sent at t=0 and the initial heartbeat interval is "1", then the next heartbeat time may be set to t=1. Control then returns to block 402.

If there is no new data message to send and the next heartbeat time has been reached (as determined at block 402), at block 406 a heartbeat message is sent with the current sequence number, which will be the sequence number of the last data message that was sent, such as the heartbeat message HB2 of FIG. 4B.

At block 407, the next heartbeat time is determined by, in this example, doubling the interval of the last heartbeat message sent and adding it to the time the most recent heartbeat message was sent in block 406. For example, if the most recently sent heartbeat message was sent at t=3 after a heartbeat interval of "2", the next heartbeat time would be set to t=7 (t=3 (time most recent heartbeat message sent)+2 (prior heartbeat interval)*2 (doubling). Control then returns to block 402.

The method for sending messages according to the heartbeat with increasing intervals technique described above assigns a sequence number to a data message and assigns corresponding sequence numbers to heartbeat messages sent subsequent to the data message. The assignment of sequence numbers to data and heartbeat messages allows lost messages to be detected within the time the data message is lost and a subsequent message is received. For example, the example electronic trading system 100 of FIG. 1 may implement the example method described in connection with FIG. 4C. The example method assigns sequence numbers to the messages sent from the gateway 120 of FIG. 1 to the trading device 110. The assignment of sequence numbers to data and heartbeat messages by the example method allows the trading device 110 of FIG. 1 to detect a lost message within the time a data message is lost and a subsequent message is received.

Figure 4D:
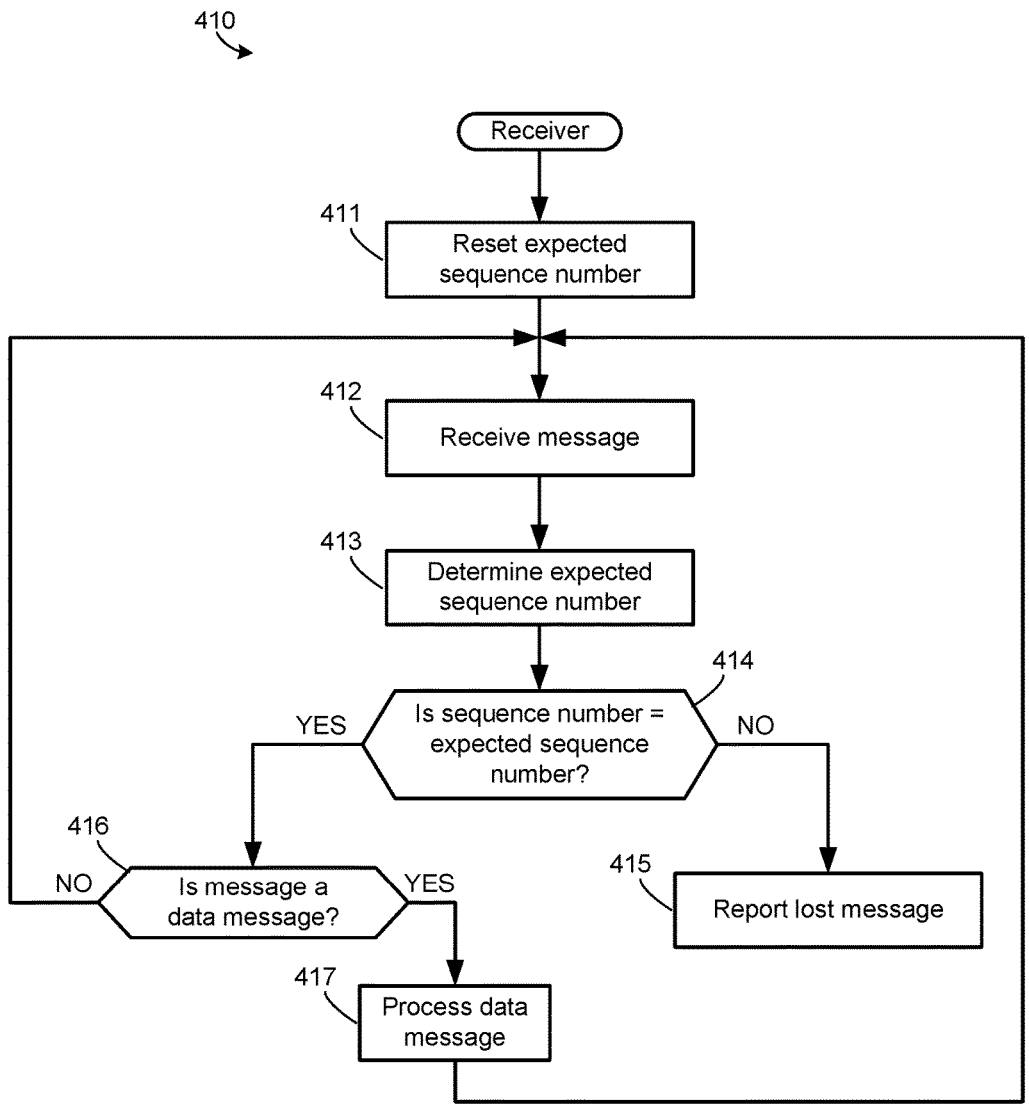
FIG. 4D illustrates a flow diagram of an example method for receiving messages according to FIGS. 4A-4B.

FIG. 4D illustrates an example flow diagram 410 of a method for receiving messages according to the heartbeat with increasing intervals technique described above. In this example, each data message has a different sequence number. For example, each data message may have a sequence number that is one greater than the previous data message's sequence number. In this example, heartbeat messages use the same sequence number as the last data message sent before the heartbeat.

At block 411, an expected sequence number for a message to be received is reset. For example, the expected sequence number may be reset to "0" or "−1"

At block 412, a message is received. The message may be a data message or a heartbeat message, for example. A lost message may be reported if a message is not received within an expected time interval. The expected time interval may be based on the initial time interval between a data message being sent and the first heartbeat message being sent or the expected time interval may be based on the interval between two heartbeat messages, for example. For example, the initial time interval and/or the interval between two heartbeat messages may be increased by a constant amount or doubled to allow for network delay variations to determine the expected time interval.

At block 413, the expected sequence number of the received message is determined. If the received message is a data message, the expected sequence number may be determined by incrementing the sequence number of the previously received message (or from the reset expected sequence number if no previous message has been received). For example, the sequence number may be incremented by 1 from "0" to "1" or from "−1" to "0." If the received message is a heartbeat message, in this example, the expected sequence number would be the same as the sequence number of the previously received message.

At block 414, the sequence number of the received message is compared to the expected sequence number determined at block 413.

If the sequence number of the received message is not equal to the expected sequence number (as determined at block 414), at block 415, a lost message may be reported. In certain embodiments, a lost message may be reported only if the lost message is a data message. In certain embodiments, the system may determine a message is missing and wait a period of time to receive the missing message. If the missing message is not received in the period of time, the system may then report the missing message as lost.

If the sequence number of the received message is equal to the expected sequence number (as determined at block 414), at block 416, it is determined if the received message is a data message. If the received message is a data message, at block 417, the data message is processed and control returns to block 412. The data message may be processed by passing the data message contents to an application, for example. If the received message is not a data message, control returns to block 412.

The method for receiving messages according to the heartbeat with increasing intervals technique described above expects an incrementing sequence number for each data message and expects sequence numbers for heartbeat messages to be the same as those in a previously sent data message. The assignment of sequence numbers to data and heartbeat messages allows lost messages to be detected within the time the data message is lost and a subsequent message is received. For example, the example electronic trading system 100 of FIG. 1 may implement the example method described in connection with FIG. 4D. The trading device 110 of FIG. 1 receives messages from the gateway 120. The trading device 110 determines expected sequence numbers for messages to be sent from the gateway 120. The trading device 110 compares the sequence numbers of the received messages to the expected sequence numbers to determine if a data message has been lost.

C. Stop Message Technique

Certain embodiments address the issue of excessive non-data network traffic by utilizing a stop message technique. In the stop message technique, a stop message is sent to indicate to a recipient that a sender will provide no additional heartbeat messages and, thus, that the next message the recipient is to receive is a data message. The stop message may also be referred to as an end message or a heartbeat suspension message, for example. Additionally, the stop message may be a distinct message type or may be denoted by a flag in another message, such as a heartbeat message or a data message. In one example, a stop message may be denoted by a flag in a data message. In this example, the stop message technique may be used alone or in combination with a heartbeat message technique.

Additionally, the number of heartbeat messages and stop message used may vary. For example, three heartbeat messages may be sent followed by a stop message. In another example, three heartbeat messages may be sent with the last heartbeat message having a stop message flag. In another example, the number of heartbeat messages to be sent may be determined based on the latency of a link/transport being used.

The stop message technique increases the detection of lost data messages in a similar manner as described above with reference to FIGS. 4A-4D. Additionally, the stop message technique further reduces network traffic due to excessive heartbeat messages and provides some tolerance to transient link failures, similar to the increasing interval technique described above with reference to FIG. 4B.

Figure 5A:
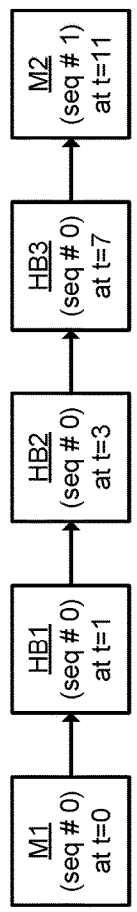
FIG. 5A illustrates example messages utilizing a heartbeat with increasing intervals technique.
Figure 5B:
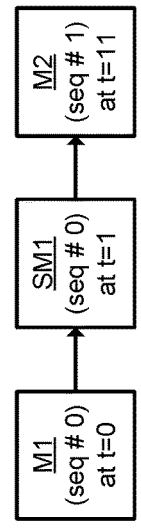
FIG. 5B illustrates example messages utilizing a stop message technique.

FIGS. 5A and 5B illustrate an advantage of the stop message technique where the number of heartbeat messages sent is reduced. FIG. 5A illustrates example messages utilizing an example heartbeat with increasing intervals technique as described above. In this example, data messages are denoted as "M" and heartbeat messages are denoted as "HB." Here, the time interval for heartbeat messages is doubled and heartbeat messages include the sequence number of the last data message sent. In this example, a first data message M1 is sent with a sequence number of "0" at time t=0. The first time interval is "1," and no new data is to be sent within this time interval. Thus, the system sends a first heartbeat message HB1 with sequence number "0" at time t=1. At time t=3 (after an interval of: 1 (prior interval)*2 (doubling)=2), where there is no new data to be sent, the system sends a second heartbeat message HB2 with sequence number "0." At time t=7 (after an interval of: 2 (prior interval)*2 (doubling)=4), where there is no new data to be sent, the system sends a third heartbeat message HB3 with sequence number "0." At time t=11 (before the next time a heartbeat message is to be sent), there is new data to be sent. Thus, the system sends a second data message M2 and increases the sequence number to "1." In the example of FIG. 5A, three heartbeat messages are sent before the second data message is sent. These heartbeat messages may be excessive and may result in increased network traffic.

FIG. 5B illustrates messages utilizing an example stop message technique as described above. In this example, stop messages are denoted as "SM" and no heartbeat messages are used. Instead, after an initial interval of "1," a stop message is sent including the sequence number of the last data message sent. In this example, a first data message M1 is sent with a sequence number of "0" at time t=0. At time t=1, where no new data is to be sent, stop message SM1 is sent with sequence number "0." This stop message indicates that no additional heartbeat messages will be sent and the next message to be received is a data message. At time t=11, data message M2 is sent with sequence number "1." The stop message technique illustrated in FIG. 5B reduces network traffic by reducing the number of heartbeat messages. In the example of FIG. 5A, three heartbeat messages are sent in between two data messages where in this example, only one stop message is sent.

D. Clearing Message Stream State Technique

Certain embodiments address state information about a message stream that is maintained by both a sender and a receiver. Message stream state is information particular to a specific message stream. A message stream is a logical communications channel for messages related to a particular object, topic, etc. For example, each order would have an associated message stream for messages related to that order. As another example, each user may have a message stream for messages directed specifically to that user, such as a personal inbox stream. For the sender, the message stream state may include the last sent sequence number, the last send time, copies of sent data for retransmission, an address or subject for the recipient, and information related to the sending time interval for heartbeat messages, for example.

The address for the recipient may be different than the underlying link and/or transport address, including, for example, IP networks, inter-process communication ("IPC"), shared memory, and/or message passing fabrics, such as InfiniBand®. For example, certain embodiments may be used on top of an IP multicast mechanism where there are one or more recipients joined to a single IP multicast group. The recipients identify messages intended for them based on a subject address included in the message. Different recipients may be interested in different subjects, yet each member of the IP multicast group would still receive all multicast messages. A recipient that is not interested in a particular subject would drop that message, as if it had never been received. While the single IP multicast group may be a predefined value, the subject address would be part of the message stream state because it is particular to a message stream associated with, for example, a working order.

For a receiver, a message stream state may include the last received sequence number, the last receive time, copies of out of order messages, an address or subject related to the sender, and information related to the sending interval for detecting lost messages, for example. Intermediate devices that, for example, route the messages may also maintain message stream state for each message stream.

Such message stream state information might be dismissed as occupying only a small portion of the memory or other resources, such as sockets, processing, connections, or ports, of a powerful server, even for many thousands of orders and/or users. However, if the server is expected to be operating for months, or longer, at a time, the number of orders and users it must maintain message stream state for is unbounded and, thus, theoretically, the server may run out of memory or other resources. Additionally, buffers may be needed or desired for each message stream if reordering of messages is supported. For a large number of message streams, this may represent a significant amount of memory usage.

In addition, certain types of recipients may have more limited memory and/or resource constraints. For example, large memory and/or resource requirements may not be practical or cost effective in some trading devices, such as mobile devices. As another example, a specialized network interface controller ("NIC") card may perform message processing and may have resource limitations that impact the number of streams that may be maintained. As another example, devices such as routers and/or bridges, including application-protocol routers, which may provide information to a large number of clients at a remote site or network, may, in various configurations, be viewed as recipients or intermediate devices. Some devices may be implemented as special purpose hardware devices with memory and/or resource constraints, for example. Thus, it is desirable to reduce the state information that needs to be stored for message streams related to infrequent messages.

Certain embodiments address the issue of storing message stream state information by, in combination with the stop message technique described above, clearing the message state information. While the underlying transport connection, such as a transmission control protocol ("TCP") connection or multicast group, may not be closed, the message stream state may be cleared, discarded, overwritten, and/or de-allocated from memory, freeing associated resources, such as sockets. Message stream state clearing may be done because, while there are no messages to be sent, there is no need to store the message stream state information. Thus, the state information may be cleared after a stop message is sent and/or received.

When a new data message is to be sent, new message stream state is created starting with a predefined sequence number. For example, each time a new data message is to be sent after a stop message has been sent, the sequence number for the new data message may be reset to "0." The destination for the data message may be derived from the source and/or content of the message itself. For example, a subject for a message may be constructed based on trader information for a shared order book. As another example, the destination may be constructed based on exchange credentials, member, group, and/or trader information, an application identifier, a user name, and/or a trading account. Because a new data message is being sent, the state related to the sending interval is set to a predefined initial value. Thus, the message stream state is effectively recreated.

Figure 5C:
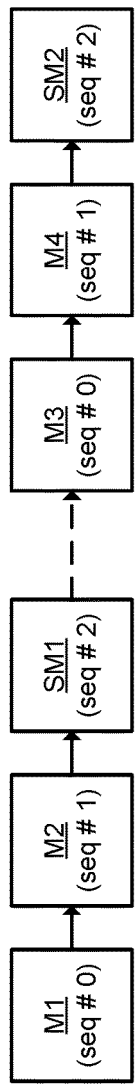
FIGS. 5C-5D illustrate example messages using stop messages.

FIG. 5C illustrates example messages utilizing an example stop message technique in combination with an example message stream state clearing technique described above. In this example, the sequence number of each message (both data messages and stop messages) in a message stream increments by "1." Data message M1 is sent with sequence number "0," data message M2 is sent with sequence number "1," and stop message SM1 is sent with sequence number "2." After sending stop message SM1, the message stream state is cleared by one or more of the sender, the receiver, and one or more intermediate devices. The sequence number for a subsequent data message to be sent is also reset to the predetermined value "0" because message stream state has been cleared. Sending stop message SM1 indicates to the recipient (and any intermediate devices) that the next received message should be a data message and that the sequence number of the data message should be "0." In this example, at a later time, data message M3 is sent with sequence number "0," data message M4 is sent with sequence number "1," and stop message SM2 is sent with sequence number "2." After receiving stop message SM1, the recipient would expect to receive a data message with a sequence number of "0." If, for example, data message M3 was lost, the recipient would instead receive data message M4 with sequence number "1." The recipient would determine that a data message had been lost because the sequence number of the received data message M4 would not be "0." In another example, if data messages M3 and M4 were lost, the recipient would determine that both data messages had been lost because the received message would be stop message SM2 with a sequence number of "2" and not data messages M3 and M4 with sequence numbers of "0" and E. Phase Number Technique As described above, when using the clearing message stream state technique, a new message stream state is created starting with a predefined sequence number. For example, each time a new data message is sent after a stop message has been sent, the sequence number for the new data message is reset to "0." A system clearing the message stream state after sending a stop message may be unable to detect lost data messages when an entire message sequence is lost. A message sequence is a sequence of data messages and a corresponding subsequent stop message. While such a system may detect a lost data message due to an incorrect ordering of sequence numbers, where an entire message sequence is lost, the sequence numbers of the received messages remain correctly ordered. The received messages remain correctly ordered because the sequence numbers for a new message sequence restart with a predetermined sequence number, such as "0." Where the sequence numbers of a new message sequence are reset, the loss of an entire message sequence may go undetected. An example of this issue is illustrated in FIG. 5D.

Figure 5D:
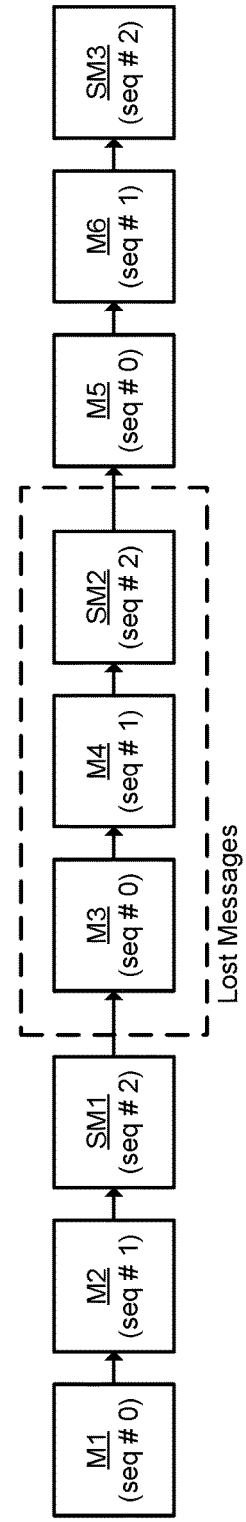

FIG. 5D illustrates example messages in which an entire message sequence may be lost without detection. In this example, the sequence number for each message increments by one and resets to "0" upon the sending of a stop message. Thus, data message M1 is sent with sequence number "0," data message M2 is sent with sequence number "1," and stop message SM1 is sent with sequence number "2." Because a stop message is sent, the sequence number of the subsequent data message is reset to "0." Data message M3 is sent with sequence number "0," data message M4 is sent with sequence number "1," and stop message SM2 is sent with sequence number "2." Where another stop message is sent, the sequence number of the subsequent data message is reset. Data message M5 is sent with sequence number "0," data message M6 is sent with sequence number "1," and stop message SM3 is sent with sequence number "2."

In this example, data message M3, data message M4, and stop message SM2 are lost. Because the sequence number of a data message is reset following the sending of a stop message, the recipient in this example would be unable to detect the lost messages M3, M4, and SM2. The recipient here would expect to receive a data message with a sequence number of "0" following the receipt of SM1, and does so, but without detecting the loss of the messages M3, M4, and SM2.

Figure 5E:
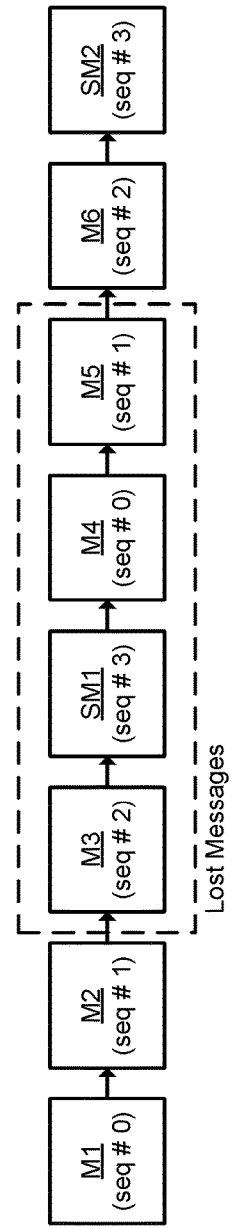
FIG. 5E illustrates example messages using stop messages and message stream clearing.

As another example, due to both network delays and message loss, part of one message sequence may be undetectably combined with part of a second message sequence and, thus, the system may be unable to detect the loss of these combined messages. FIG. 5E illustrates an example. In this example, similar to the example discussed above and shown in FIG. 5D, the sequence number for each message increments by "1" and resets to "0" upon the sending of a stop message. In the example of FIG. 5E, data message M1 is sent with sequence number "0," data message M2 is sent with sequence number "1," data message M3 is sent with sequence number "2," and stop message SM1 is sent with sequence number "3." The sequence numbers are reset and data message M4 is sent with sequence number "0," data message M5 is sent with sequence number "1," data message M6 is sent with sequence number "2," and stop message SM2 is sent with sequence number "3."

In this example, messages M3, SM1, M4, and M5 are lost. After receiving data message M2 with sequence number "1," the recipient expects to receive a data message with a sequence number of "2." Because the sequence numbers are reset after the sending of a stop message, the recipient receives a data message with a sequence number for "2," but without detecting the loss of messages M3, SM1, M4, and M5. This scenario may occur if messages are sent at greater intervals but are buffered and/or delayed at an intermediate device and some messages are then dropped.

To address the scenario where the message stream state is cleared and sequence numbers of subsequent sent data messages are reset and message sequences may be lost, certain embodiments provide for a phase number that is included in each message in addition to the sequence number. The phase number is an identifier that remains the same for an entire message sequence and is set to another value for a subsequent message sequence, for example, after a stop message is sent. The phase number may be a numeric, alphanumeric, or bit pattern value, for example.

Figure 5F:
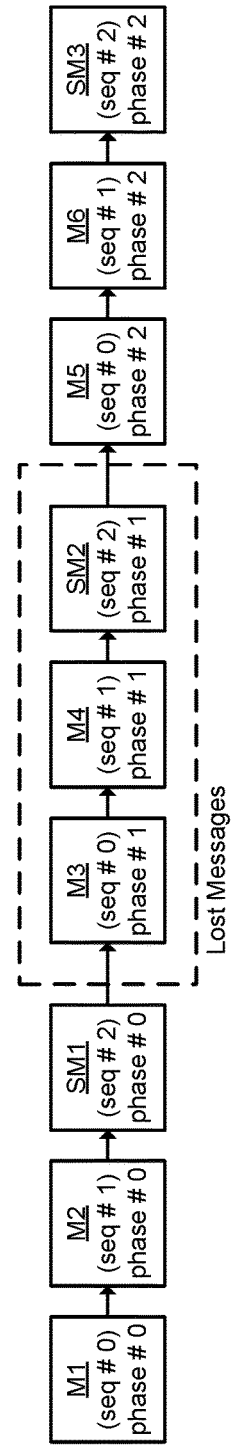
FIGS. 5F-5H illustrate example messages using stop messages, message stream clearing, and phase numbers.

FIG. 5F illustrates the example messages of FIG. 5D with phase numbers according to the phase number technique. In the example shown in FIG. 5F, the phase numbers of each message sequence are incremented by one. Thus, the first message sequence is sent with phase number "0," the second message sequence is sent with phase number "1," and the third message sequence is sent with phase number "2." In this example, the recipient expects to receive message sequences with phase numbers incremented by one. Therefore, when the third message sequence is received with phase number "2" after the first message sequence was received with phase number "0," the recipient may determine that a message sequence with phase number "1" has been lost.

Figure 5G:
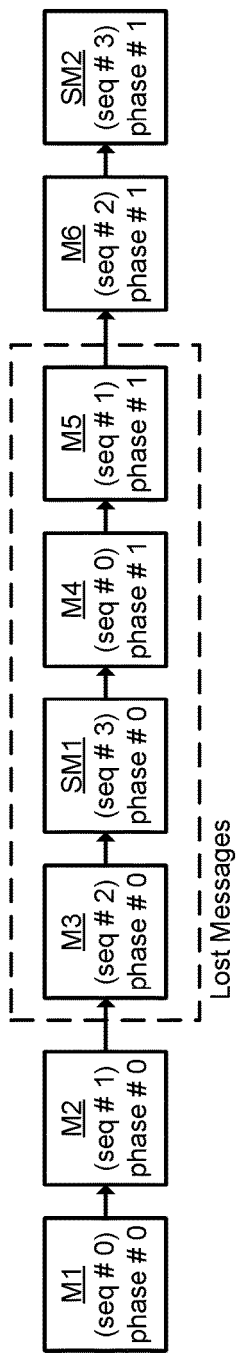

FIG. 5G illustrates the example messages of FIG. 5E with phase numbers included. In FIG. 5G, the phase numbers of each message sequence are incremented by one. Thus, the first message sequence is sent with phase number "0" and the second message sequence is sent with phase number "1." In this example, the recipient expects to receive message sequences with phase numbers incremented by one. After receiving data message M2 with sequence number "1" and phase number "0," the recipient expects to receive a data message with a sequence number of "2" and a phase number of "0." Where messages M3, SM1, M4, and M5 are lost, the recipient instead receives data message M6 with sequence number "2" and phase number "1." Because the phase number of the received data message is not "0," the recipient is able to detect a sequence of lost messages.

In another example, the phase number is part of the message stream state that may be cleared because each message in the same message sequence has the same phase.

Benefits of clearing the message stream state are described above. When a new message sequence begins, the value for the phase for the next message sequence is taken from a global value or function available on the sender that is changed in a non-repeating, or very infrequently repeating, manner each time a new sequence is sent from the sender. This results in the next phase number not being predictable to a recipient. For example, the sender may maintain a single 32-bit unsigned integer value that is available to the protocol implementation and that is incremented by one each time a new message sequence begins. A new phase number is chosen each time a new sequence is sent from the sender, regardless of the recipient. Thus, in this example, the recipient is unable to predict the phase number of the message sequences because the sender may be sending message sequences to many different recipients.

Figure 5H:
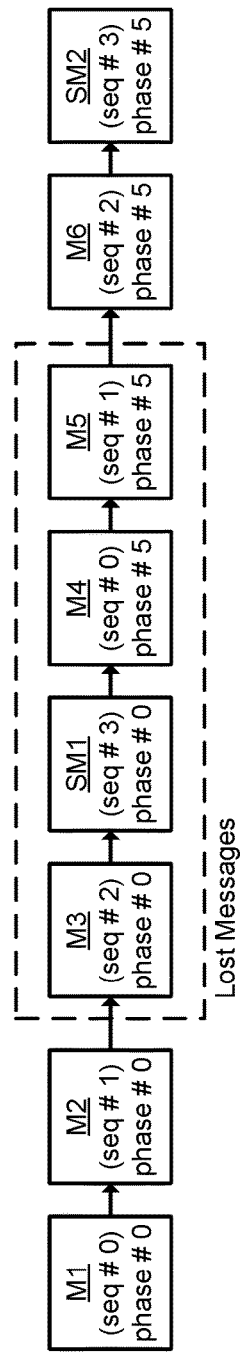

FIG. 5H illustrates example messages in which a recipient is unable to predict the phase number of a message sequence. FIG. 5H is similar to the example illustrated in FIG. 5G, but, in FIG. 5H, the phase numbers are randomly assigned. In the example of FIG. 5H, the first message sequence is sent with phase number "0" and the second message sequence is sent with phase number "5." After receiving data message M2 with sequence number "1" and phase number "0," the recipient would expect to receive a stop message or a data message with phase number "0." Where messages M3, SM1, M4, and M5 are lost, the recipient receives data message M6 with sequence number "2" and phase number "5." Comparing the phase number "5" of data message M6 with the phase number "0" of data message M2, the recipient determines that a sequence of messages has been lost.

In another example, where a recipient is unable to predict the phase number of a message sequence, the recipient may be unable to detect the loss of an entire message sequence where the phase numbers are cleared with the message stream state. To detect lost messages in this example, a mechanism that is able to detect link state problems may be employed. For example, a separate mechanism which sends periodic heartbeats on each link/transport mechanism, independent of the specific message streams because multiple message streams may be sent over the same link/transport, may detect these types of link failures and applications may act accordingly to prevent problems due to losing a complete sequence. In addition, in some situations, because of the nature of the data, the loss of a message sequence may be apparent to the recipient while processing a later sequence.

Figure 6:
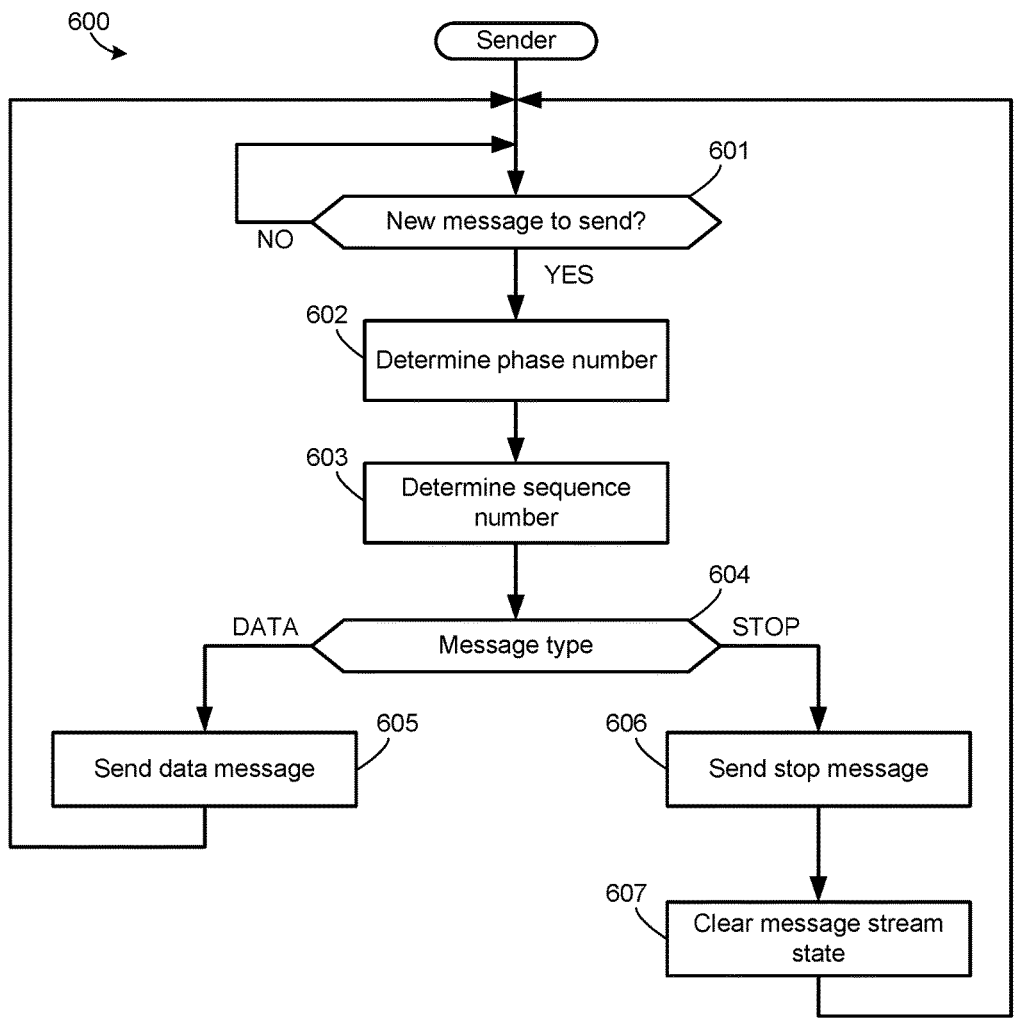
FIG. 6 illustrates a flow diagram of an example method for sending messages using phase numbers according to certain embodiments.

FIG. 6 illustrates an example flow diagram 600 of a method for sending messages using phase numbers as described above. In this example, phase numbers are used with each message along with sequence numbers and no heartbeat messages are used, only a stop message after an initial interval in which a data message has not been sent. In certain embodiments, heartbeat messages may also be sent before a stop message is sent. In addition, an embodiment of the message stream state clearing technique discussed above is also incorporated.

At block 601, a determination is made whether a new message is to be sent. The new message may be, for example, a new data message or a stop message. For example, a new data message to be sent may be received from an application. As another example, a timer associated with an initial interval may expire, indicating that a stop message should be sent. In certain embodiments, a new message to be sent may be a heartbeat message. If it is determined that a new message is not to be sent, then control returns to block 601.

If a new message is to be sent (as determined at block 601), at block 602 a phase number is determined. If the new message is the first data message in a message sequence, the phase number may be determined by, for example, incrementing the phase number of the previous message sequence (or starting at a predefined value such as "0" if this is the first message sequence sent) or taking a new phase number from a global value or function. For example, the phase number of the last message sequence may be incremented by 1 from "0" to "1." If the new message is not the first data message in a message sequence, the phase number may be determined to be the phase number of the last message sent. For example, if the phase number of the last message sent was "1," then the phase number for the new message to be sent is also "1."

At block 603, a sequence number is determined. If the new message is a data message, the sequence number may be determined by incrementing the sequence number of the previously sent data message (or starting a predefined value such as "0" if this is the first data message in the message sequence). For example, the sequence number may be incremented by 1 from "0" to "1." If the new message is a stop message (or, in certain embodiments, a heartbeat message), the sequence number may be determined to be the sequence number of the last data message sent in the message sequence.

At block 604, if the new message is a data message, control proceeds to block 605. If the new message is a stop message, control proceeds to block 606.

At block 605, the new message (a data message) is sent and control returns to block 601.

In certain embodiments incorporating heartbeat messages, from block 604 control would pass to a block to send the new heartbeat message and determine a new next heartbeat time before control returns to block 601.

At block 606, the new message (a stop message) is sent. At block 607, message stream state is cleared, as discussed above, and control returns to block 601.

For example, the example electronic trading system 100 of FIG. 1 may implement the example method described in connection with FIG. 6. The example method assigns sequence numbers and phase numbers to the messages sent by the gateway 120 of FIG. 1 to the trading device 110. The assignment of sequence numbers and phase numbers to message sequences by the example method allows the trading device 110 of FIG. 1 to detect a lost message sequence. Additionally, the example method allows the gateway 120 to clear the message stream state after sending a complete message sequence.

Figure 7:
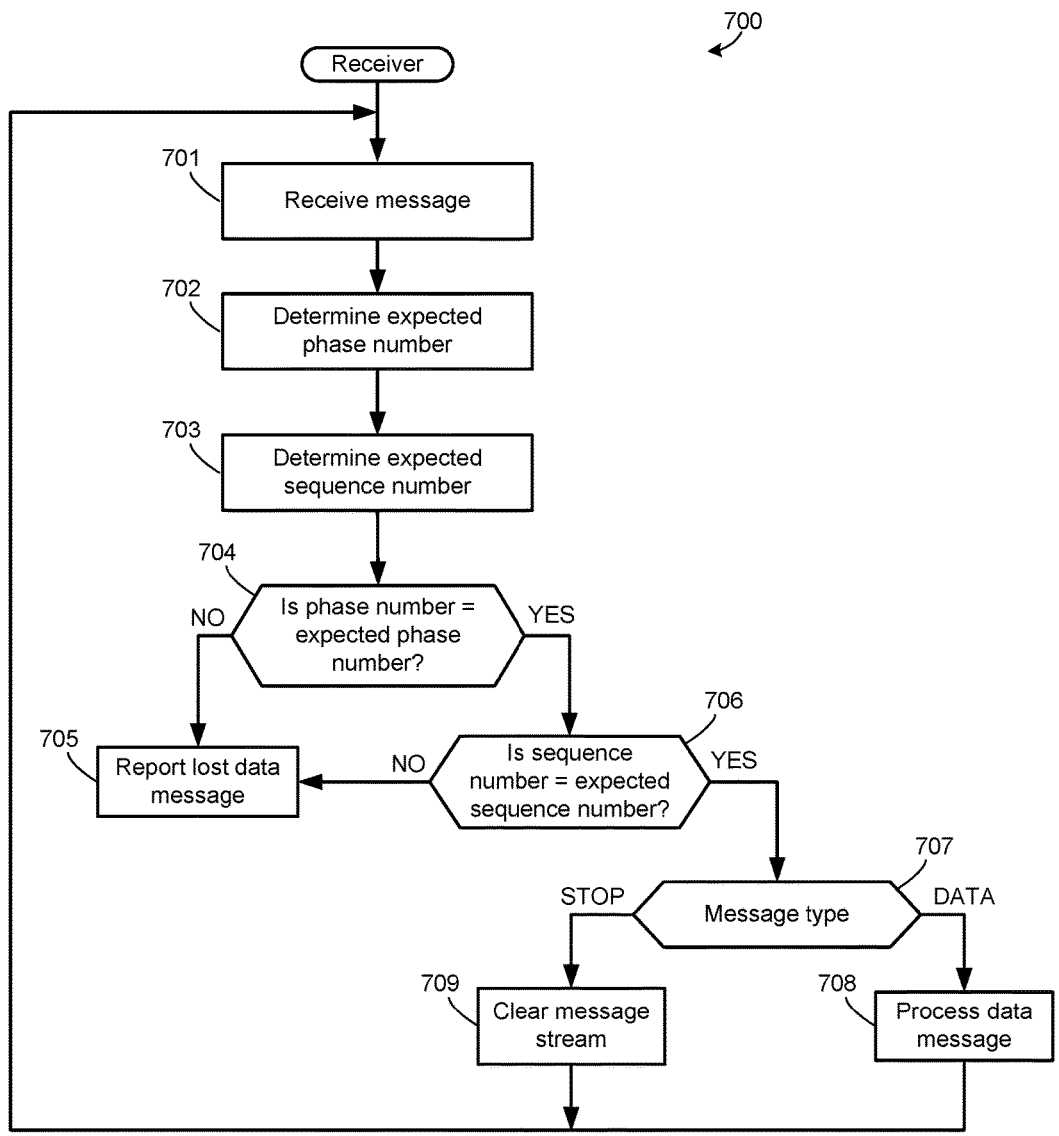
FIG. 7 illustrates a flow diagram of an example method for receiving messages using phase numbers according to certain embodiments.

FIG. 7 illustrates an example flow diagram 700 for a method for receiving messages according to the phase numbers technique described above. In this example, phase numbers are used with each message along with sequence numbers and each message stream has a different phase number. For example, each message stream may have a phase number that is one greater than the previous message stream's phase number. As another example, each message stream may have a phase number that is not predictable to the recipient. In addition, in this example, each data message has a different sequence number. For example, each data message may have a sequence number that is one greater than the previous data message's sequence number. In this example, no heartbeat messages are used, only a stop message after an initial interval in which a data message has not been sent. In certain embodiments, heartbeat messages may also be sent before a stop message is sent. In addition, an embodiment of the message stream state clearing technique discussed above is also incorporated.

At block 701, a message is received. The message may be a data message or a stop message, for example. A lost message may be reported if a message is not received within an expected time interval. The expected time interval may be based on the initial time interval between a data message and the first heartbeat message (or, here, stop message) or the expected time interval may be based on the interval between two heartbeat messages, for example. For example, the initial time interval and/or the interval between two heartbeat messages may be increased by a constant amount or doubled to allow for network delay variations to determine the expected time interval.

At block 702, the expected phase number of the received message is determined. The expected phase number of the received message, in this example, is the same as the phase number of the previously received message in the message sequence. If the received message is the first message of the message sequence (which may be determined based on whether no previous messages have been received or the previous message was a stop message), the expected phase number is determined based on whether the phase number is predictable by the receiver or not. If the phase number is predictable by the receiver, the expected phase number may be determined according to a predetermined function. For example, the expected phase number may be determined by incrementing the phase number of the previous message sequence (or starting at a predefined value such as "0" if this is the first message sequence received). If the phase number is not predictable by the receiver, the phase number of the first message received in the message sequence is taken as the expected phase number and is expected to be different from the phase number of the previous message sequence.

At block 703, the expected sequence number of the received message is determined. If the received message is a data message, the expected sequence number may be determined by incrementing the sequence number of the previously received message (or from a predefined initial sequence number if no previous message has been received in this message sequence). For example, the sequence number may be incremented by 1 from "0" to "1." If the received message is a stop message, in this example, the expected sequence number would be the same as the sequence number of the previously received message.

At block 704, the phase number of the received message is compared to the expected phase number determined at block 702.

If the phase number of the received message is not equal to the expected phase number (as determined at block 704), at block 705, a lost data message may be reported. In certain embodiments, a lost message may be reported only if the lost message is a data message. In certain embodiments, the system may determine a message is missing and wait a period of time to receive the missing message. If the missing message is not received in the period of time, the system may then report the missing message as lost.

If the phase number of the received message is equal to the expected phase number (as determined at block 704), at block 706, the sequence number of the received message is compared to the expected sequence number determined in block 703.

If the sequence number of the received message is not equal to the expected sequence number (as determined at block 706), at block 705, a lost message may be reported as discussed above.

If the sequence number of the received message is equal to the expected sequence number (as determined at block 706), at block 707, if the received message is a data message, control proceeds to block 708. If the received message is a stop message, control proceeds to block 709.

If the received message is a data message, at block 708, the data message is processed. For example, a received data message may be passed to an application. Control then returns to block 701.

If the received message is a stop message, at block 709, the message stream state is cleared, as discussed above, and control returns to block 701.

In certain embodiments incorporating heartbeat messages, from block 707 control would pass to a block to update the next expected heartbeat time control would return to block 701.

For example, the example electronic trading system 100 of FIG. 1 may implement the example method described in connection with FIG. 7. The trading device 110 of FIG. 1 receives messages from the gateway 120. The trading device 110 compares the phase numbers and sequence numbers of the messages received from the gateway 120 to expected phase numbers and sequence numbers, respectively, to determine if a message has been lost. Additionally, the example method allows the trading device 110 to clear the message stream state after receiving a complete message sequence.

V. Example Sender Devices and Receiver Devices

Figure 8:
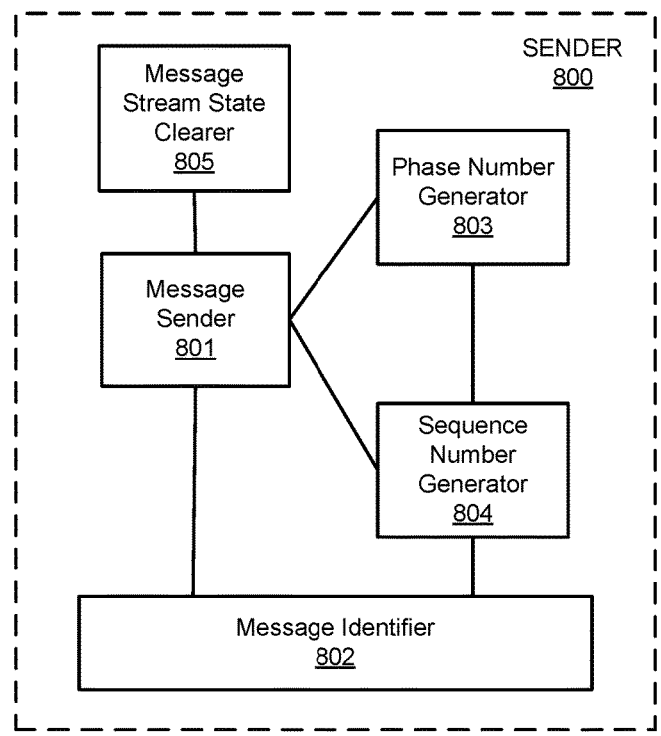
FIG. 8 illustrates a block diagram of an example sender device according to certain embodiments.

FIG. 8 illustrates a block diagram of an example sender device 800. The sender device 800 implements the techniques discussed above individually and in combination. The sender device 800 includes a message sender 801, a message identifier 802, a phase number generator 803, a sequence number generator 804, and a message stream state clearer 805.

In certain embodiments, only a subset of the techniques discussed above (and/or a subset of combinations) may be implemented. For example, a sender device that does not provide the phase number technique may not include a phase number generator 803.

The message sender 801 sends messages. For example, the message sender 801 may send data messages, heartbeat messages, and stop messages. Depending on the particular technique(s) being utilized, some message types may not be sent. For example, if the phase number technique is being utilized with only stop messages, heartbeat messages will not be sent. As another example, the phase number technique may be utilized with the heartbeat with increasing interval technique and the stop messages technique, so data messages, heartbeat messages, and stop messages may be sent. Also, depending on the particular technique(s) being utilized, messages may include sequence number or both phase numbers and sequence numbers. For example, messages sent utilizing the heartbeat with increasing intervals technique may not include phase numbers. As another example, messages sent utilizing the phase number technique may include both phase numbers and sequence numbers.

The message sender 801 may receive data to send in a data message from an application. The message sender 801 may track a next heartbeat time so that heartbeat messages and/or stop messages may be sent at appropriate intervals according to the particular technique(s) being utilized.

In certain embodiments, separate message senders may be utilized to send different message types.

The message identifier 802 identifies the type of message being sent. For example, the message identifier 802 may identify a message to be sent as a data message, a heartbeat message, or a stop message.

The phase number generator 803 determines and provides a phase number for a message to be sent. The phase number is provided to the message sender 801 for messages to be sent that include a phase number. The phase number may be determined as discussed above. When the message to be sent is the first message in a message sequence, the phase number may be determined by, for example, incrementing the phase number of the previous message sequence (or starting at a predefined value such as "0" if this is the first message sequence sent) or taking a new phase number from a global value or function. When the message to be sent is not the first message in a message sequence, the phase number may be determined to be the phase number of the last message sent.

The sequence number generator 804 determines and provides a sequence number for a message to be sent. The sequence number may be determined based on the type of message being sent. The sequence number may be determined as discussed above. In some embodiments, the sequence number for a heartbeat message and/or a stop message is the same as the sequence number for the last data message sent. In some embodiments, the sequence number for a heartbeat message and/or a stop message is incremented from the sequence number of the last message sent, whether the last message was a data message or a heartbeat message. In some embodiments, for the first message of a new message sequence, the sequence number is reset to a predefined value.

The message stream state clearer 805 clears message stream state after a stop message is sent as discussed above.

Figure 9:
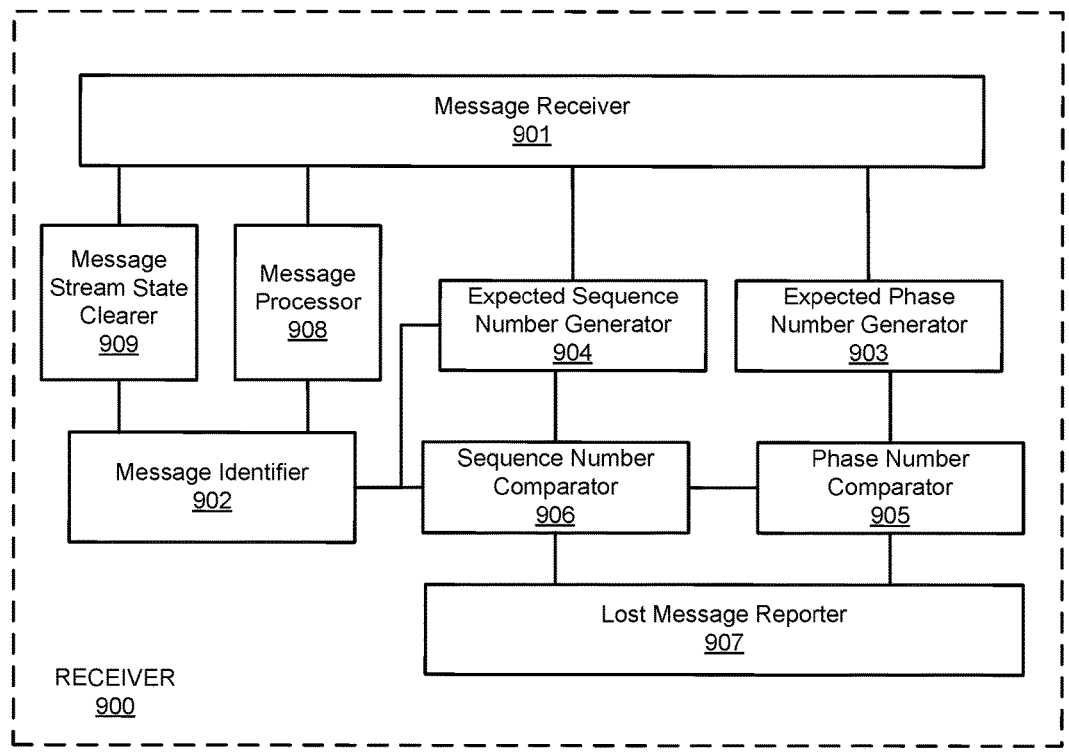
FIG. 9 illustrates a block diagram of an example receiver device according to certain embodiments.

FIG. 9 illustrates a block diagram of an example receiver device 900. The receiver device 900 implements the techniques discussed above individually and in combination. The receiver device 900 includes a message receiver 901, a message identifier 902, an expected phase number generator 903, an expected sequence number generator 904, a phase number comparator 905, a sequence number comparator 906, a lost message reporter 907, a message processor 908, and a message stream state clearer 909.

In certain embodiments, only a subset of the techniques discussed above (and/or a subset of combinations) may be implemented. For example, a receiver device that does not provide the phase number technique may not include an expected phase number generator 903 and/or a phase number comparator 905.

The message receiver 901 receives messages. For example, the message receiver 901 may receive data messages, heartbeat messages, and stop messages. Depending on the particular technique(s) being utilized, some message types may not be received. For example, if the phase number technique is being utilized with only stop messages, heartbeat messages will not be received. As another example, the phase number technique may be utilized with the heartbeat with increasing interval technique and the stop messages technique, so data messages, heartbeat messages, and stop messages may be received. Also, depending on the particular technique(s) being utilized, messages may include sequence number or both phase numbers and sequence numbers. For example, messages received utilizing the heartbeat with increasing intervals technique may not include phase numbers. As another example, messages received utilizing the phase number technique may include both phase numbers and sequence numbers.

The message receiver 901 may track an expected next heartbeat time so that heart beat messages and/or stop messages are detected as lost if received within an expected time interval. The expected time interval may be based on the initial time interval between a data message and the first heartbeat message or stop message or the expected time interval may be based on the interval between two heartbeat messages, for example. For example, the initial time interval and/or the interval between two heartbeat messages may be increased by a constant amount or doubled to allow for network delay variations to determine the expected time interval.

In certain embodiments, separate message receivers may be utilized to receive different message types.

The message identifier 902 identifies the type of message received. For example, the message identifier 902 may identify a received message to be a data message, a heartbeat message, or a stop message.

The expected phase number generator 903 determines and provides an expected phase number for a received message. The phase number may be determined as discussed above. The expected phase number of the received message is the same as the phase number of the previously received message in the message sequence. If the received message is the first message of the message sequence (which may be determined based on whether no previous messages have been received or the previous message was a stop message), the expected phase number is determined based on whether the phase number is predictable by the receiver or not. If the phase number is predictable by the receiver, the expected phase number may be determined according to a predetermined function. For example, the expected phase number may be determined by incrementing the phase number of the previous message sequence (or starting at a predefined value such as "0" if this is the first message sequence received). If the phase number is not predictable by the receiver, the phase number of the first message received in the message sequence is taken as the expected phase number and is expected to be different from the phase number of the previous message sequence.

The expected sequence number generator 904 determines and provides an expected sequence number for a received message. The expected sequence number may be determined based on the type of message received. The expected sequence number may be determined as discussed above. In some embodiments, the expected sequence number for a heartbeat message and/or a stop message is the same as the sequence number for the last data message received. In some embodiments, the expected sequence number for a heartbeat message and/or a stop message is incremented from the sequence number of the last data message received. In some embodiments, for the first message of a new message sequence, the expected sequence number is reset to a predefined value.

The phase number comparator 905 determines if a phase number of the received message is equal to the expected phase number provided by the expected phase number generator 903. If not, the lost message reporter 907 is used to report a lost message.

The sequence number comparator 906 determines if a sequence number of the received message is equal to the expected sequence number provided by the expected sequence number generator 904. If not, the lost message reporter 907 is used to report a lost message.

The lost message reporter 907 reports a lost message. In certain embodiments, a lost message may be reported only if the lost message is a data message. In certain embodiments, the message receiver 901 may determine a message is missing and wait a period of time to receive the missing message. If the missing message is not received in the period of time, the message receiver 901 may then use the lost message reporter 907 to report the missing message as lost.

The message processor 908 processes the received message. For example, a received data message may be passed to an application.

The message stream state clearer 909 clears message stream state after a stop message is received as discussed above.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A method including:
sending, by a computing device, a first data message, wherein the first data message includes data related to a topic, wherein the first data message includes a first data message sequence number with a value of a predefined initial sequence number, wherein the first data message includes a first data message phase number;
sending, by the computing device, a first stop message, wherein the first stop message includes a stop message phase number, wherein the stop message phase number is the same as the first data message phase number, wherein the stop message indicates that no heartbeat messages will be sent after the stop message is sent and before another data message is sent; and
sending, by the computing device, a second data message, wherein the second data message is sent after the first stop message, wherein the second data message includes data related to the topic, wherein the second data message includes a second data message sequence number with a value of the predefined initial sequence number, wherein the second data message includes a second data message phase number, wherein the second data message phase number is different than the first data message phase number.

2. The method of claim 1, wherein the first data message includes a flag indicating that the first data message is also the first stop message.

3. The method of claim 1, further including sending, by the computing device, a first heartbeat message, wherein the first heartbeat message is sent at a first time interval after the first data message is sent, wherein the first heartbeat message includes a first heartbeat message phase number, wherein the first heartbeat message phase number is the same as the first data message phase number.

4. The method of claim 3, wherein the first heartbeat message includes a flag indicating that the first heartbeat message is also the first stop message.

5. The method of claim 1, further including clearing, by the computing device, message stream state associated with the topic, wherein the message stream state is cleared after the stop message is sent, wherein the message stream state includes information particular to a message stream, wherein the message stream is a logical communications channel for messages related to the topic.

6. The method of claim 5, wherein the information particular to the message stream includes the first data message phase number.

7. The method of claim 5, wherein clearing the message stream state includes de-allocating the message stream state from a memory of the computing device.

8. A computer readable medium having stored therein instructions executable by a processor, including instructions executable to:
send a first data message, wherein the first data message includes data related to a topic, wherein the first data message includes a first data message sequence number with a value of a predefined initial sequence number, wherein the first data message includes a first data message phase number;
send a first stop message, wherein the first stop message includes a stop message phase number, wherein the stop message phase number is the same as the first data message phase number, wherein the stop message indicates that no heartbeat messages will be sent after the stop message is sent and before another data message is sent; and
send a second data message, wherein the second data message is sent after the first stop message, wherein the second data message includes data related to the topic, wherein the second data message includes a second data message sequence number with a value of the predefined initial sequence number, wherein the second data message includes a second data message phase number, wherein the second data message phase number is different than the first data message phase number.

9. The computer readable medium of claim 8, wherein the first data message includes a flag indicating that the first data message is also the first stop message.

10. The computer readable medium of claim 8, further including instructions executable to send a first heartbeat message, wherein the first heartbeat message is sent at a first time interval after the first data message is sent, wherein the first heartbeat message includes a first heartbeat message phase number, wherein the first heartbeat message phase number is the same as the first data message phase number.

11. The computer readable medium of claim 10, wherein the first heartbeat message includes a flag indicating that the first heartbeat message is also the first stop message.

12. The computer readable medium of claim 8, further including instructions executable to clear message stream state associated with the topic, wherein the message stream state is cleared after the stop message is sent, wherein the message stream state includes information particular to a message stream, wherein the message stream is a logical communications channel for messages related to the topic.

13. The computer readable medium of claim 12, wherein the information particular to the message stream includes the first data message phase number.

14. The computer readable medium of claim 12, wherein clearing the message stream state includes de-allocating the message stream state from a memory of a computing device including the processor.

15. A system including:
a computing device,
wherein the computing device is configured to send a first data message, wherein the first data message includes data related to a topic, wherein the first data message includes a first data message sequence number with a value of a predefined initial sequence number, wherein the first data message includes a first data message phase number;
wherein the computing device is configured to send a first stop message, wherein the first stop message includes a stop message phase number, wherein the stop message phase number is the same as the first data message phase number, wherein the stop message indicates that no heartbeat messages will be sent after the stop message is sent and before another data message is sent; and
wherein the computing device is configured to send a second data message, wherein the second data message is sent after the first stop message, wherein the second data message includes data related to the topic, wherein the second data message includes a second data message sequence number with a value of the predefined initial sequence number, wherein the second data message includes a second data message phase number, wherein the second data message phase number is different than the first data message phase number.

16. The system of claim 15, wherein the first data message includes a flag indicating that the first data message is also the first stop message.

17. The system of claim 15, wherein the computing device is further configured to send a first heartbeat message, wherein the first heartbeat message is sent at a first time interval after the first data message is sent, wherein the first heartbeat message includes a first heartbeat message phase number, wherein the first heartbeat message phase number is the same as the first data message phase number.

18. The system of claim 17, wherein the first heartbeat message includes a flag indicating that the first heartbeat message is also the first stop message.

19. The system of claim 15, wherein the computing device is further configured to clear message stream state associated with the topic, wherein the message stream state is cleared after the stop message is sent, wherein the message stream state includes information particular to a message stream, wherein the message stream is a logical communications channel for messages related to the topic.

20. The system of claim 19, wherein the information particular to the message stream includes the first data message phase number.

21. The system of claim 19, wherein clearing the message stream state includes de-allocating the message stream state from a memory of the computing device.

\* \* \* \* \*